US012711876B2

(12) United States Patent
Thuot et al.

(10) Patent No.: US 12,711,876 B2
(45) Date of Patent: Aug. 18, 2026

(54) ADAPTIVE KEYBOARD TEACHING SYSTEM

(71) Applicant: Logitech Europe S.A., Lausanne (CH)

(72) Inventors: Jonathan Thuot, Fremont, CA (US); Daniel Blumer, Quebec (CA); Madeleine Mortimore, Palo Alto, CA (US)

(73) Assignee: Logitech Europe S.A., Lausanne (CH)

( * ) Notice: Subject to any disclaimer, the term of this patent is extended or adjusted under 35 U.S.C. 154(b) by 1016 days.

(21) Appl. No.: 17/732,175

(22) Filed: Apr. 28, 2022

(65) Prior Publication Data

US 2023/0351913 A1 Nov. 2, 2023

(51) Int. Cl.

| | |
|---|---|
| ***G09B 13/04*** | (2006.01) |
| ***G06F 3/02*** | (2006.01) |
| ***G06V 40/19*** | (2022.01) |
| ***G06V 40/20*** | (2022.01) |
| ***G09B 5/02*** | (2006.01) |
| ***G09B 5/04*** | (2006.01) |

(52) U.S. Cl.

CPC ............ *G09B 13/04* (2013.01); *G06V 40/19* (2022.01); *G06V 40/28* (2022.01); *G09B 5/02* (2013.01); *G09B 5/04* (2013.01); *G06F 3/02* (2013.01)

(58) Field of Classification Search

CPC . G09B 13/04; G09B 5/02; G09B 5/04; G09B 17/00; G06V 40/19; G06V 40/28; G06V 40/193; G06F 3/02; G06F 3/013; H01H 13/78

USPC ....... 434/176, 202, 227, 228, 231, 233, 118; 200/5; 362/97

See application file for complete search history.

(56) References Cited

U.S. PATENT DOCUMENTS

| | | | | |
|---|---|---|---|---|
| 3,664,036 | A * | 5/1972 | Boswell, Jr. ........... | G09B 13/02 84/478 |
| 3,703,040 | A * | 11/1972 | Hill ........................ | G09B 19/02 434/202 |
| 3,894,346 | A | 7/1975 | Ward et al. | |
| 11,093,048 | B1 | 8/2021 | Knoppert et al. | |

(Continued)

OTHER PUBLICATIONS

U.S. Appl. No. 17/732,174, "Advisory Action", Apr. 5, 2023, 5 pages.

(Continued)

*Primary Examiner* — Xuan M Thai
*Assistant Examiner* — Zarchary Joseph Pollock
(74) *Attorney, Agent, or Firm* — Kilpatrick Townsend & Stockton LLP

(57) ABSTRACT

A computer-implemented method comprising: providing a visual-based instruction to press one or more target keys of a plurality of keys on a physical keyboard; receiving sensor data corresponding to a user interaction with the keyboard; analyzing the sensor data and determining how a hand of the user is engaging with the physical keyboard; and providing a user feedback on one or more feedback elements of the physical keyboard in response to determining that the user's hand is incorrectly engaging with the keyboard, which may include the user pressing a key using an incorrect hand; the user pressing the key with an incorrect finger; or the user not anchoring or incorrectly anchoring portions of their hand when engaging with the physical keyboard to press the one or more target keys of the plurality of keys.

19 Claims, 11 Drawing Sheets

(56) References Cited

U.S. PATENT DOCUMENTS

2002/0061499 A1* 5/2002 Stark .................... G09B 13/04 434/227
2013/0082928 A1* 4/2013 Kim .................... G06F 3/0425 345/168
2014/0145961 A1 5/2014 Szent-miklosy
2014/0184505 A1 7/2014 Fullerton et al.
2015/0058776 A1 2/2015 Liu et al.
2015/0147730 A1* 5/2015 Kapinos ................ G06F 3/0219 434/227
2016/0012745 A1* 1/2016 Olsen .................... G09B 13/04 434/227
2016/0042897 A1 2/2016 Qian
2016/0232803 A1* 8/2016 Schmidt ................ G09B 13/00
2017/0068316 A1* 3/2017 Seok .................... G06F 3/0237
2017/0293365 A1* 10/2017 Miura .................... G06F 21/31
2018/0219553 A1 8/2018 Casparian et al.
2020/0004346 A1* 1/2020 Vlasov .................. H01F 7/0226
2020/0012357 A1 1/2020 Lien
2020/0303140 A1 9/2020 Porcella et al.
2021/0263600 A1* 8/2021 Starrett ............... G06F 3/04845
2021/0267028 A1* 8/2021 Starrett ................ G06F 3/0202
2021/0271326 A1 9/2021 Hinchet et al.

OTHER PUBLICATIONS

U.S. Appl. No. 17/732,174, “Final Office Action”, Jan. 31, 2023, 21 pages.
U.S. Appl. No. 17/732,174, “Non-Final Office Action”, Oct. 5, 2022, 18 pages.

* cited by examiner

ADAPTIVE KEYBOARD TEACHING SYSTEM

CROSS-REFERENCES TO RELATED APPLICATIONS

The following U.S. patent application was filed concurrently with the present application, and the entire disclosure of the other application listed below is incorporated by reference into this application in its entirety for all purposes:

Application Ser. No. 17/732,174, filed Apr. 28, 2022, entitled "ADAPTIVE KEYBOARD TEACHING SYSTEM."

BACKGROUND

A computer peripheral device can be any device that provides input and/or output for a host computing device (a "computer"). Common peripheral devices include keyboards, mice, speakers, displays (e.g., computer monitors, televisions, mobile phones, smart watches, etc.). Some computer peripheral devices are conventionally configured as input devices (e.g., keyboards, mice, keypads) and others are often configured as output devices (e.g., video displays, speakers, etc.). Some computer peripheral devices (also referred to as "peripherals," "computer peripherals," "peripheral devices," etc.) can be configured as both input and output devices (often referred to as "I/O devices") because they provide both input and output from a host computing device. One conventional example is an external hard drive, which provides both input and output data.

Keyboards are ubiquitous and are one of the most popular peripheral devices for computer interfacing and data entry. There have been many significant innovations and improvements in keyboards over the last several decades to make them more functional, efficient, and ergonomic, with better longevity. Some functional improvements include the inclusion of multi-function buttons, programmable keys, multi-host control, multi-media features, multiple resistance profile settings, controls, or configuration technologies, better movement tracking (e.g., optical sensing), wireless implementations, and the like. Some innovations that have improved efficiency include better key switch technology, low power settings, and the use of low power communication protocols (e.g., BLE). Ergonomic improvements include contoured, inclined key layouts, wrist pad and kick stand configurations, and the like. Furthermore, materials and quality control developments have substantially improved device longevity.

Despite these many improvements, there is a considerable learning curve for those learning to type. Many people do not receive proper training and often resort to the hunt-and-peck style of typing, which is inefficient and draws the user's eyes away from the application (e.g., word processor) they are interfacing with. Keyboard mastery typically requires consistent practice, memorization, and repeated movements to develop muscle memory, and many contemporary methods and systems for teaching proper typing technique are cumbersome, tedious, and adopt a one size fits all approach, which can be woefully ineffective for many and especially for children. Better solutions are needed.

BRIEF SUMMARY

A computer-implemented method comprises: receiving typing data corresponding to one or more key presses on a physical keyboard device having a plurality of keys, the physical keyboard device including one or more feedback elements; determining typing performance characteristics of a user based on the typing data; determining a typing proficiency of the user based on the typing performance characteristics; and adapting the one or more feedback elements on the physical keyboard to operate according to one of a plurality of output schemas based on the typing proficiency of the user. In some aspects, the typing performance characteristics include at least one of: a typing accuracy; a typing speed; or hand motor skills. The feedback elements can include lighting elements corresponding to the plurality of keys on the physical keyboard, wherein the plurality of output schemas includes a plurality of lighting modes configured to provide visual guidance identifying a location of one or more target keys of the plurality of keys, and wherein each of the plurality of lighting modes provides a different amount of visual guidance based on the typing proficiency of the user. In some cases, the lighting modes includes at least two or more of: a first lighting mode causing the plurality of lighting elements to highlight a side of the keyboard that the one or more target keys are located; a second lighting mode causing the plurality of lighting elements to highlight a column or row of keys that the one or more target keys are located; a third lighting mode causing the plurality of lighting elements to highlight a zone of the keyboard that the one or more target keys are located, wherein the keyboard includes a home row of keys, and wherein the zone corresponds to a plurality of keys adjacent to a particular key of the home row of keys; and a fourth lighting mode causing the plurality of lighting elements to individually highlight the one or more target keys. In some implementations, the lighting modes are time-based lighting modes and include at least one of: a first animated lighting mode that reveals the one or more target keys over a threshold time by gradually increasing an illumination of the one or more target keys using a first lighting pattern based on a time threshold; or a second animated lighting mode that reveals the one or more target keys over a threshold time by gradually decreasing an illumination of the plurality of keys not including the one or more target keys using a second lighting pattern based on a time threshold. In some embodiments, each of the one or more feedback elements includes a key switch operationally controlled by one of: an electro-permanent magnet (EPM) assembly; or an electrostatic brake, wherein the EPM assembly and the electrostatic brake are operable to provide a tunable key press feedback profile for their corresponding key switch including: a first key press feedback profile for one or more target keys; and a second key press feedback profile for the plurality of keys not including the one or more target keys, wherein the second key press feedback profile has a greater resistance to key switch actuation than the first key press feedback profile. In certain embodiments, the physical keyboard device and a display device are communicatively coupled and controlled by a host computing device, the method further comprising: causing a visual feedback corresponding to the one or more target keys to be rendered on the display device, wherein the plurality of output schemas on the physical keyboard device is different than the visual feedback on the display device. The one or more feedback elements may operate according to a first set of the plurality of output schemas when a user is determined to have satisfactory hand motor skills, and the one or more feedback elements may operate according to a second, different set of the plurality of output schemas when a user is determined to have unsatisfactory hand motor skills.

In some embodiments, a system comprises: one or more processors; one or more machine-readable, non-transitory storage mediums that include instructions configured to cause the one or more processors to perform operations including: receiving typing data corresponding to one or more key presses on a physical keyboard device having a plurality of keys, the physical keyboard device including one or more feedback elements; determining typing performance characteristics of a user based on the typing data; determining a typing proficiency of the user based on the typing performance characteristics; and adapting the one or more feedback elements on the physical keyboard to operate according to one of a plurality of output schemas based on the typing proficiency of the user. The typing performance characteristics can include at least one of: a typing accuracy; a typing speed; or hand motor skills. The feedback elements can include lighting elements corresponding to the plurality of keys on the physical keyboard, wherein the plurality of output schemas includes a plurality of lighting modes configured to provide visual guidance identifying a location of one or more target keys of the plurality of keys, and wherein each of the plurality of lighting modes provides a different amount of visual guidance based on the typing proficiency of the user. In some aspects, the lighting modes can include at least two or more of: a first lighting mode causing the plurality of lighting elements to highlight a side of the keyboard that the one or more target keys are located; a second lighting mode causing the plurality of lighting elements to highlight a column or row of keys that the one or more target keys are located; a third lighting mode causing the plurality of lighting elements to highlight a zone of the keyboard that the one or more target keys are located, wherein the keyboard includes a home row of keys, and wherein the zone corresponds to a plurality of keys adjacent to a particular key of the home row of keys; and a fourth lighting mode causing the plurality of lighting elements to individually highlight the one or more target keys. The lighting modes can be time-based lighting modes and include at least one of: a first animated lighting mode that reveals the one or more target keys over a threshold time by gradually increasing an illumination of the one or more target keys using a first lighting pattern based on a time threshold; or a second animated lighting mode that reveals the one or more target keys over a threshold time by gradually decreasing an illumination of the plurality of keys not including the one or more target keys using a second lighting pattern based on a time threshold. In certain embodiments, each of the one or more feedback elements includes a key switch operationally controlled by one of: an electro-permanent magnet (EPM) assembly; or an electrostatic brake, wherein the EPM assembly and the electrostatic brake are operable to provide a tunable key press feedback profile for their corresponding key switch including: a first key press feedback profile for one or more target keys; and a second key press feedback profile for the plurality of keys not including the one or more target keys, wherein the second key press feedback profile has a greater resistance to key switch actuation than the first key press feedback profile. In some cases, the physical keyboard device and a display device are communicatively coupled and controlled by a host computing device, with the one or more machine-readable, non-transitory storage mediums further including instructions that cause the one or more processors to perform operations including: causing a visual feedback corresponding to the one or more target keys to be rendered on the display device, wherein the plurality of output schemas on the physical keyboard device is different than the visual feedback on the display device. The one or more feedback elements can operate according to a first set of the plurality of output schemas when a user is determined to have satisfactory hand motor skills, and the one or more feedback elements may operate according to a second, different set of the plurality of output schemas when a user is determined to have unsatisfactory hand motor skills.

Further embodiments are directed to a computer-readable storage medium having data stored therein representing software executable by one or more processors, the software including instructions operable to cause the one or more processors to perform operations including: receiving typing data corresponding to one or more key presses on a physical keyboard device having a plurality of keys, the physical keyboard device including one or more feedback elements; determining typing performance characteristics of a user based on the typing data; determining a typing proficiency of the user based on the typing performance characteristics; and adapting the one or more feedback elements on the physical keyboard to operate according to one of a plurality of output schemas based on the typing proficiency of the user. The typing performance characteristics can include at least one of: a typing accuracy; a typing speed; or hand motor skills. The feedback elements can include lighting elements corresponding to the plurality of keys on the physical keyboard, wherein the plurality of output schemas includes a plurality of lighting modes configured to provide visual guidance identifying a location of one or more target keys of the plurality of keys, and wherein each of the plurality of lighting modes provides a different amount of visual guidance based on the typing proficiency of the user. In some cases, the lighting modes includes at least two or more of: a first lighting mode causing the plurality of lighting elements to highlight a side of the keyboard that the one or more target keys are located; a second lighting mode causing the plurality of lighting elements to highlight a column or row of keys that the one or more target keys are located; a third lighting mode causing the plurality of lighting elements to highlight a zone of the keyboard that the one or more target keys are located, wherein the keyboard includes a home row of keys, and wherein the zone corresponds to a plurality of keys adjacent to a particular key of the home row of keys; and a fourth lighting mode causing the plurality of lighting elements to individually highlight the one or more target keys. In some cases, the lighting modes are time-based lighting modes and include at least one of: a first animated lighting mode that reveals the one or more target keys over a threshold time by gradually increasing an illumination of the one or more target keys using a first lighting pattern based on a time threshold; or a second animated lighting mode that reveals the one or more target keys over a threshold time by gradually decreasing an illumination of the plurality of keys not including the one or more target keys using a second lighting pattern based on a time threshold. In some aspects, each of the one or more feedback elements includes a key switch operationally controlled by one of: an electro-permanent magnet (EPM) assembly; or an electrostatic brake, wherein the EPM assembly and the electrostatic brake are operable to provide a tunable key press feedback profile for their corresponding key switch including: a first key press feedback profile for one or more target keys; and a second key press feedback profile for the plurality of keys not including the one or more target keys, wherein the second key press feedback profile has a greater resistance to key switch actuation than the first key press feedback profile. The physical keyboard device and a display device can be communicatively coupled and controlled by a host computing device, the software further including instructions operable to cause the one or more processors to perform operations including: causing a visual feedback corresponding to the one or more target keys to be rendered on the display device, wherein the plurality of output schemas on the physical keyboard device is different than the visual feedback on the display device. The one or more feedback elements may operate according to a first set of the plurality of output schemas when a user is determined to have satisfactory hand motor skills, and the one or more feedback elements operate according to a second, different set of the plurality of output schemas when a user is determined to have unsatisfactory hand motor skills.

In certain embodiments, a computer-implemented method comprises: providing an audio or visual-based instruction to press one or more target keys of a plurality of keys on a physical keyboard; receiving sensor data corresponding to a user interaction with the keyboard; analyzing the sensor data and determining how a hand of the user is engaging with the physical keyboard; and providing a user feedback on one or more feedback elements of the physical keyboard in response to determining that the user's hand is incorrectly engaging with the keyboard. The method can further comprise applying a second user feedback on the one or more feedback elements that is different than the user feedback on the physical keyboard in response to determining that the user's hand is correctly engaging with the keyboard. In some implementations, the user's hand may be incorrectly engaged with the physical keyboard when at least one of the following occurs: the user is pressing a key using an incorrect hand; the user is pressing the key with an incorrect finger; or the user is not anchoring or incorrectly anchoring portions of their hand when engaging with the physical keyboard to press the one or more target keys of the plurality of keys. In some cases, the one or more feedback elements includes a plurality of lighting elements, and wherein the user feedback includes executing a lighting schema with the plurality of lighting elements that guides the user to correctly engage with the keyboard. The method can further comprise: detecting when a computer mouse is being controlled by the user, wherein the computer mouse and physical keyboard are communicatively coupled to a common host computing device; determining when the user lets go of the computer mouse; and executing a second lighting schema that highlights a home row on the plurality of keys of the keyboard. In certain embodiments, the one or more feedback elements can be key switches of the plurality of keys that are operationally controlled by one of: an electro-permanent magnet (EPM) assembly; or an electrostatic brake, wherein the EPM assembly and the electrostatic brake are operable to provide a tunable key press feedback profile for their corresponding key switch including: a first key press feedback profile for one or more target keys; and a second key press feedback profile for the plurality of keys not including the one or more target keys, wherein the second key press feedback profile has a greater resistance to key switch actuation than the first key press feedback profile. In some cases, the sensor data may be received from an image sensor device, wherein analyzing the sensor data includes: identifying an orientation and location of the user's hand based on the sensor data; comparing the orientation and location of the user's hand to a reference; wherein determining that the user's hand is incorrectly engaged with the keyboard includes detecting when the orientation and location of the user's hand is not within a threshold orientation and location as compared to the reference. In some aspects, the sensor data is received from an image sensor device, wherein analyzing the sensor data includes: determine a direction of a user's gaze based on the sensor data; comparing the direction of the user's gaze to a location of the target keys of the plurality of keys, wherein determining that the user's hand is incorrectly engaged with the keyboard includes detecting when the user's gaze is not within a threshold distance of the location of the target keys of the plurality of keys. In certain implementations, the sensor data may be received from one or more touch sensitive sensors, wherein analyzing the sensor data includes determining a location of the user's hand based on the sensor data, and wherein determining that the user's hand is incorrectly engaged with the keyboard includes detecting when the location of the user's hand is not on the target keys of the plurality of keys.

In further embodiments, a system comprises: one or more processors; one or more machine-readable, non-transitory storage mediums that include instructions configured to cause the one or more processors to perform operations including: providing an audio or visual-based instruction to press one or more target keys of a plurality of keys on a physical keyboard; receiving sensor data corresponding to a user interaction with the keyboard; analyzing the sensor data and determining how a hand of the user is engaging with the physical keyboard; and providing a user feedback on one or more feedback elements of the physical keyboard in response to determining that the user's hand is incorrectly engaging with the keyboard. In some aspects, the instructions are further configured to cause the one or more processors to perform operations including: applying a second user feedback on the one or more feedback elements that is different than the user feedback on the physical keyboard in response to determining that the user's hand is correctly engaging with the keyboard. The user's hand may be incorrectly engaged with the physical keyboard when at least one of the following occurs: the user is pressing a key using an incorrect hand; the user is pressing the key with an incorrect finger; or the user is not anchoring or incorrectly anchoring portions of their hand when engaging with the physical keyboard to press the one or more target keys of the plurality of keys. In some cases, the one or more feedback elements includes a plurality of lighting elements, and wherein the user feedback includes executing a lighting schema with the plurality of lighting elements that guides the user to correctly engage with the keyboard. In some embodiments, the instructions are further configured to cause the one or more processors to perform operations including: detecting when a computer mouse is being controlled by the user, wherein the computer mouse and physical keyboard are communicatively coupled to a common host computing device; determining when the user lets go of the computer mouse; and executing a second lighting schema that highlights a home row on the plurality of keys of the keyboard. In certain embodiments, the one or more feedback elements are key switches of the plurality of keys that are operationally controlled by one of: an electro-permanent magnet (EPM) assembly; or an electrostatic brake, wherein the EPM assembly and the electrostatic brake are operable to provide a tunable key press feedback profile for their corresponding key switch including: a first key press feedback profile for one or more target keys; and a second key press feedback profile for the plurality of keys not including the one or more target keys, wherein the second key press feedback profile has a greater resistance to key switch actuation than the first key press feedback profile. In some embodiments, the sensor data is received from an image sensor device, wherein analyzing the sensor data includes: identifying an orientation and location of the user's hand based on the sensor data; comparing the orientation and location of the user's hand to a reference; wherein determining that the user's hand is incorrectly engaged with the keyboard includes detecting when the orientation and location of the user's hand is not within a threshold orientation and location as compared to the reference. In some implementations, the sensor data is received from an image sensor device, wherein analyzing the sensor data includes: determine a direction of a user's gaze based on the sensor data; comparing the direction of the user's gaze to a location of the target keys of the plurality of keys, wherein determining that the user's hand is incorrectly engaged with the keyboard includes detecting when the user's gaze is not within a threshold distance of the location of the target keys of the plurality of keys. In certain embodiments, the sensor data is received from one or more touch sensitive sensors, wherein analyzing the sensor data includes determining a location of the user's hand based on the sensor data, and wherein determining that the user's hand is incorrectly engaged with the keyboard includes detecting when the location of the user's hand is not on the target keys of the plurality of keys.

In some embodiments, a computer-readable storage medium having data stored therein representing software executable by one or more processors, the software including instructions operable to cause the one or more processors to perform operations including: providing an audio or visual-based instruction to press one or more target keys of a plurality of keys on a physical keyboard; receiving sensor data corresponding to a user interaction with the keyboard; analyzing the sensor data and determining how a hand of the user is engaging with the physical keyboard; and providing a user feedback on one or more feedback elements of the physical keyboard in response to determining that the user's hand is incorrectly engaging with the keyboard. In some embodiments, the instructions are further operable to cause the one or more processors to perform operations including: applying a second user feedback on the one or more feedback elements that is different than the user feedback on the physical keyboard in response to determining that the user's hand is correctly engaging with the keyboard. In some cases, the user's hand is incorrectly engaged with the physical keyboard when at least one of the following occurs: the user is pressing a key using an incorrect hand; the user is pressing the key with an incorrect finger; or the user is not anchoring or incorrectly anchoring portions of their hand when engaging with the physical keyboard to press the one or more target keys of the plurality of keys. In some embodiments, the one or more feedback elements includes a plurality of lighting elements, and wherein the user feedback includes executing a lighting schema with the plurality of lighting elements that guides the user to correctly engage with the keyboard. In some embodiments, the instructions are further operable to cause the one or more processors to perform operations including: detecting when a computer mouse is being controlled by the user, wherein the computer mouse and physical keyboard are communicatively coupled to a common host computing device; determining when the user lets go of the computer mouse; and executing a second lighting schema that highlights a home row on the plurality of keys of the keyboard. In certain embodiments, the one or more feedback elements are key switches of the plurality of keys that are operationally controlled by one of: an electro-permanent magnet (EPM) assembly; or an electrostatic brake, wherein the EPM assembly and the electrostatic brake are operable to provide a tunable key press feedback profile for their corresponding key switch including: a first key press feedback profile for one or more target keys; and a second key press feedback profile for the plurality of keys not including the one or more target keys, wherein the second key press feedback profile has a greater resistance to key switch actuation than the first key press feedback profile. In some embodiments, the sensor data is received from an image sensor device, wherein analyzing the sensor data includes: identifying an orientation and location of the user's hand based on the sensor data; and comparing the orientation and location of the user's hand to a reference; wherein determining that the user's hand is incorrectly engaged with the keyboard includes detecting when the orientation and location of the user's hand is not within a threshold orientation and location as compared to the reference. In some embodiments, the sensor data is received from an image sensor device, wherein analyzing the sensor data includes: determining a direction of a user's gaze based on the sensor data; comparing the direction of the user's gaze to a location of the target keys of the plurality of keys, wherein determining that the user's hand is incorrectly engaged with the keyboard includes detecting when the user's gaze is not within a threshold distance of the location of the target keys of the plurality of keys. In further implementations, the sensor data may be received from one or more touch sensitive sensors, wherein analyzing the sensor data includes determining a location of the user's hand based on the sensor data, and wherein determining that the user's hand is incorrectly engaged with the keyboard includes detecting when the location of the user's hand is not on the target keys of the plurality of keys.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
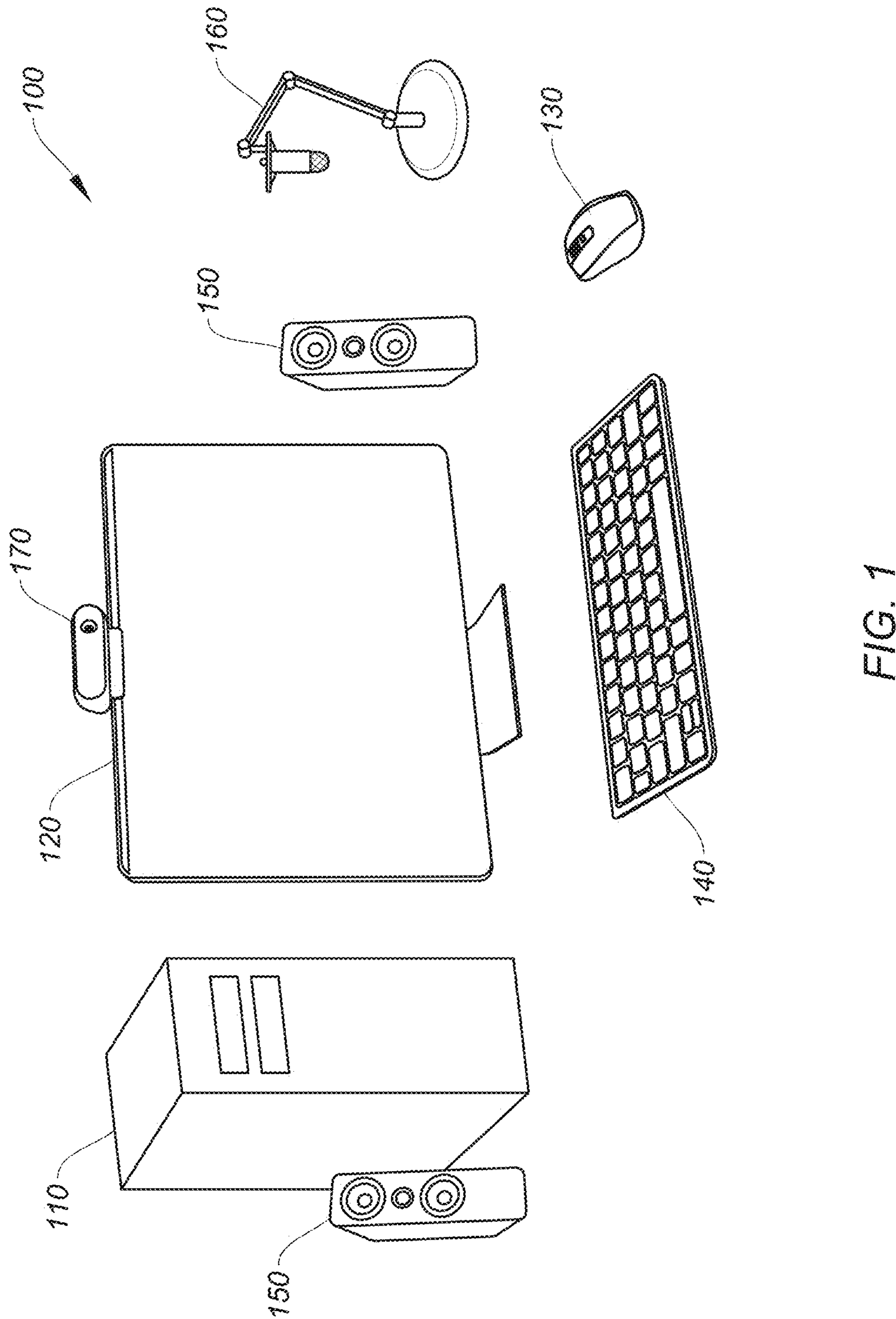
FIG. 1 shows an example of a computing system that can include any of a variety of host computing devices and peripheral devices that can be configured to perform aspects of the various inventions described herein.

Aspects of the present disclosure relate generally to computer peripheral device, and more particularly to keyboard systems for teaching and developing typing proficiency for a user, according to certain embodiments.

In the following description, various examples of keyboard systems for teaching and developing typing proficiency are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to mitigate any obfuscation of the novel features described herein.

The following high-level summary is intended to provide a basic understanding of some of the novel innovations depicted in the figures and presented in the corresponding descriptions provided below. Aspects of the invention relate to keyboard systems for teaching and developing typing proficiency and good typing habits for a wide range of age ranges, proficiencies, and physical abilities. For instance, some implementations can analyze performance characteristics (e.g., typing accuracy, speed, motor skills) of a user based on typing data and determine the user's typing proficiency. The system can then control feedback elements on the physical keyboard (e.g., RGB lights, haptics, mechanical key resistance) to help guide the user to type one or more target keys on the keyboard using appropriately adapted feedback element output schemas that match the user's skill level. Both positive and negative feedback can be used, as well as static and dynamic output schemas that can be adapted periodically or in real-time based on the user's current typing proficiency. FIGS. 4A-4D show examples of various lighting output schemas that provide different levels of visual guidance to the user, including highlighting an entire side of a keyboard, a column or row, a key zone (e.g., keys adjacent or near a target key), or individual keys themselves, based on the user's proficiency. In some aspects, mechanical feedback can be used to guide a user to one or more target keys on the keyboard. For example, keyboard key switches can be configured with electro-permanent magnet-based systems, electrostatic brake systems, or haptic systems to control how a key feels to a user, which can provide positive or negative feedback for user guidance. In certain embodiments, time-based and animated lighting modes can be used for dynamic feedback and alternative guidance modes to accommodate users with limited motor controls or the like.

In some embodiments, systems and methods are directed to teaching proper typing habits by providing an audio or visual-based instruction to press one or more target keys of a plurality of keys on a physical keyboard, receiving sensor data corresponding to a user interaction with the keyboard, analyzing the sensor data and determining how a hand of the user is engaging with the physical keyboard, and providing a user feedback on one or more feedback elements (e.g., lighting elements, mechanical elements, etc.) of the physical keyboard in response to determining that the user's hand is incorrectly engaging with the keyboard. This may be when the user is pressing a key using an incorrect hand, finger, or is not anchoring or incorrectly anchoring portions of their hand when engaging with the physical keyboard to press the one or more target keys of the plurality of keys. In some aspects, analyzing the sensor data may include identifying an orientation and location of the user's hand based on the sensor data, which may incorporate image sensor data (e.g., gaze detection), touch sensor data, or the like. It is to be understood that this high-level summary is presented to provide the reader with a baseline understanding of some of the novel aspects of the present disclosure and a conceptual roadmap to the details that follow. This high-level summary in no way limits the scope of the various embodiments described throughout the detailed description and each of the figures referenced above are further described below in greater detail and in their proper scope.

FIG. 1 shows an example of a computing system 100 that can include any of a variety of host computing devices and peripheral devices that can be configured to perform aspects of the various inventions described herein. Computing system 100 shows a host computing device (shown as a desktop computer) 110 and a number of peripheral devices communicatively coupled to the host computing device, including a display 120, a computer mouse 130, a keyboard 140, speakers 150, a microphone 160, and webcam 170. Although the host computing device is shown as a desktop computer, other types of host computing devices can be used including gaming systems, laptop computers, set top boxes, entertainment systems or any other suitable host computing device (e.g., smart phone, smart wearable, or the like). In some cases, multiple host computing devices may be used and one or more of the peripheral devices may be communicatively coupled to one or more host computing devices (e.g., a mouse may be coupled to multiple host computing devices). A host computing device may be referred to herein as a "host computer," "host device," "host computing device," "computing device," "computer," or the like, and may include a machine readable medium (not shown) configured to store computer code, such as driver software, firmware, and the like, where the computer code may be executable by one or more processors of the host computing device to control the one or more peripheral input devices.

A typical peripheral device can include any suitable input peripheral, output peripheral or input/output peripheral device including those shown or any peripheral device not shown (e.g., game controller, remote control, wearables (e.g., gloves, watch, head mounted display), AR/VR controller, stylus device, gaming pedals/shifters, or the like. A peripheral input device may be referred to as an "input device," "peripheral device," "peripheral," or the like. It should be understood that although the majority of embodiments depicted herein are focused on applications involving computer-related peripheral devices, those of ordinary skill in the art would understand how to adapt the concepts applied to non-computer related applications. For instance, embodiments of the invention may apply the lighting schemas and methods to home entertainment systems and/or internet-of-things (IoT)-based systems.

Figure 2:
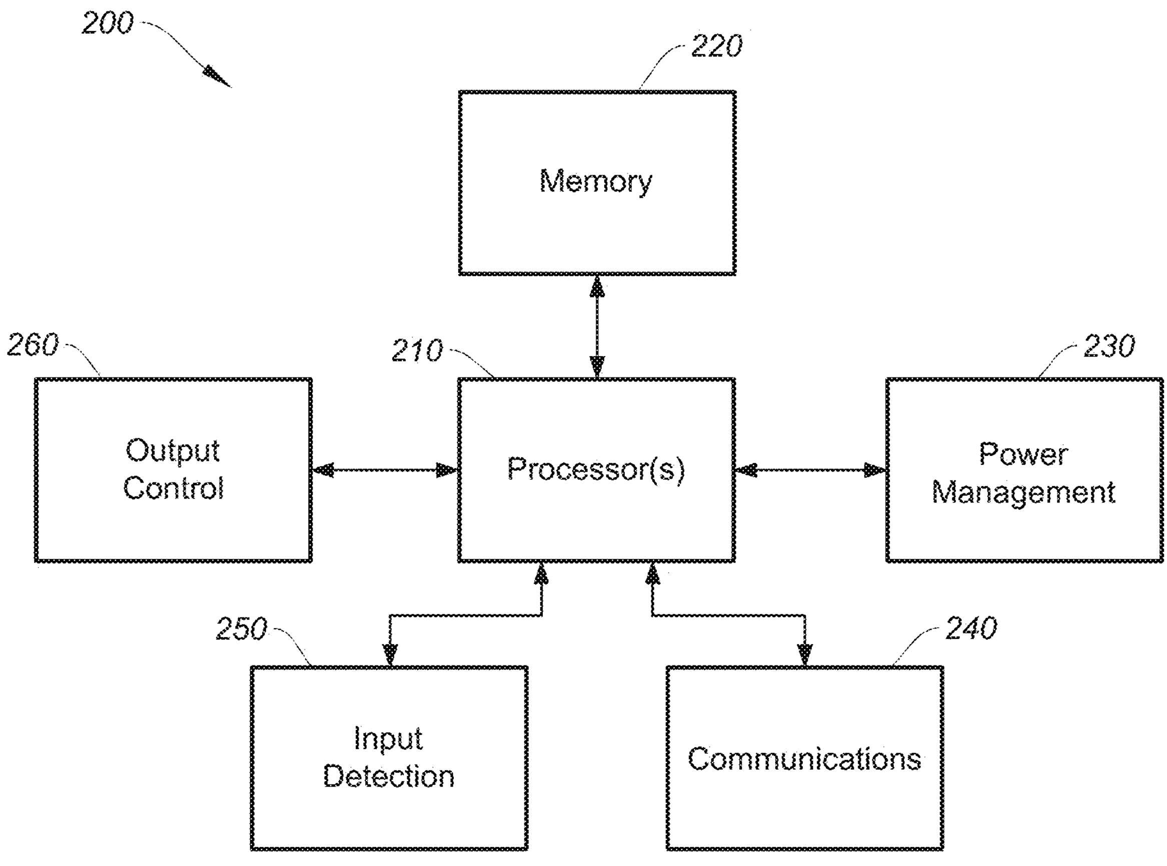
FIG. 2 shows a system for operating a peripheral input device, according to certain embodiments.

FIG. 2 shows a system 200 for operating a peripheral input device, according to certain embodiments. System 200 may be configured to operate any of the peripheral devices specifically shown and described herein (e.g., keyboard 140) or peripherals not shown but within the wide purview of the present disclosure. System 200 may include processor(s) 210, memory 220, a power management system 230, a communication system 240, an input detection module 250, and an output control module 260. Each of the system blocks 220-260 can be in electrical communication with the processor(s) 210 (e.g., via a bus system). System 200 may also include additional functional blocks that are not shown or discussed to help prevent obfuscation of the novel features described herein. System blocks 220-260 may be implemented as separate modules, or alternatively, more than one system block may be implemented in a single module. In the context described herein, system 200 can be incorporated into any peripheral device described herein and may be configured to perform any of the various methods of controlling visual output elements on one or more peripheral devices, host computing devices, or the like, as would be appreciated by one of ordinary skill in the art with the benefit of this disclosure.

In certain embodiments, processor(s) 210 may include one or more microprocessors and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of input device 135 (e.g., system block 220-260). Alternatively or additionally, some of system blocks 220-260 may include an additional dedicated processor, which may work in conjunction with processor(s) 210. Processor(s) 210 may be local to the peripheral device (e.g., contained therein), may be external to the peripheral device (e.g., off-board processing, such as by a corresponding host computing device), or a combination thereof. As further described below, processor 302 of FIG. 3 may work in conjunction with processor 210 to perform some or all of the various methods (e.g., methods 600, 700) described throughout this disclosure. One of ordinary skill in the art would understand the many variations, modifications, and alternative embodiments that are possible. Processor(s) 210 may perform any of the various functions and methods (e.g., methods 700, 800, etc.) described and/or covered by this disclosure, and may operate to generate the various commands (e.g., HID commands, etc., in conjunction with any other resources/blocks in system 200) and corresponding functions described herein.

Memory 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

In some embodiments, memory 220 may store one or more lighting output schemas for one or more visual output elements (e.g., on the peripheral devices, host computing device, or a combination thereof) including wave effects, flashing effects, breathing effects, simulated light movement sequences, modulations of brightness and/or contrast, color changes/modulations, alphanumeric/symbolic patterns (e.g., similar to 7-segment displays), or the like. In some embodiments, memory 220 may store a location data corresponding to a physical location of one or more of the various devices (e.g., peripheral devices, host computing devices) relative to one another. The location data may be acquired from user input via a graphical user interface (GUI), from one or more images sensors (e.g., to generate image data showing the location of the various devices that the system), communication data (e.g., time-of-flight sensing between the various devices), or the like, as further described below and as would be appreciated by one of ordinary skill in the art with the benefit of this disclosure. In some aspects, memory 220 may store a location of visual output elements (e.g., LEDs, liquid crystal displays (LCDs), etc.) including which peripheral/host device they are located, where they are located on the corresponding peripheral/host device, or the like.

In some embodiments, memory 220 can store typing data corresponding to one or more key presses on a physical keyboard device having a plurality of keys. Memory 220 can store data corresponding to user performance characteristics (e.g., typing accuracy, typing speed, hand motor skills, etc.) of a user or multiple users, profiles, etc., as further described below. Memory 220 can store output schemas including static and dynamic lighting modes (e.g., lighting patterns), key press feedback profiles, haptic output profiles, or other suitable output schemas. Memory 220, memory storage system 306 (described below), or any combination thereof, may store any data described throughout this document, as would be appreciated by one of ordinary skill in the art with the benefit of this disclosure.

Power management system 230 can be configured to manage power distribution, recharging, power efficiency, haptic motor power control, and the like. In some embodiments, power management system 230 can include a battery (not shown), a USB based recharging system for the battery (not shown), and power management devices (e.g., voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH NiCd), or a corded power supply. The recharging system can be an additional cable (specific for the recharging purpose) or it can use a USB connection to recharge the battery.

In some embodiments, power management system 230 may be configured to power off one or more visual output elements when it is determined that they are visually obscured by an object, as further described below in greater detail at least with respect to FIG. 7. For instance, when a user's hands are placed on a keyboard, some of the keys may be obscured by the user's hand (e.g., detected via contact, image sensors, etc., as further described below). Visual output elements (e.g., LEDs) under the user's hand that are configured to be turned on for a particular lighting output schema may be turned off to save power because they would not be visible by the user anyway. Visual output elements may be turned off individually, as part of a set of elements, or a combination thereof.

Communications system 240 can be configured to provide wireless communication with a corresponding host computing device (e.g., 105, 110, 115), or other devices and/or peripherals, according to certain embodiments. Communications system 240 can be configured to provide radio-frequency (RF), Bluetooth®, infra-red (IR), ZigBee®, or other suitable communication technology to communicate with other computing devices and/or peripheral devices. System 200 may optionally comprise a hardwired connection to the corresponding host computing device. For example, input device 135 can be configured to receive a Universal Serial Bus (USB) cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 150, output control modules 260, etc.).

Input detection module 250 can control the detection of a user-interaction with input elements on input device 160. For instance, input detection module 250 can detect user inputs from keys, buttons, roller wheels, scroll wheels, touch pads, click wheels, dials, keypads, microphones, GUIs, touch-sensitive GUIs, image sensor (e.g., webcam) based detection such as gesture detection, audio based detection such as voice input (e.g., via microphone), or the like, as would be appreciated by one of ordinary skill in the art with the benefit of this disclosure.

In some embodiments, output control module 260 can control various outputs for a corresponding peripheral input device. For instance, output control module 260 may control a number of visual output elements (LEDs, LCDs), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any peripheral device. Further, system 200 can be applied to any of the input devices described in the embodiments herein, whether explicitly, referentially, or tacitly described (e.g., would have been known to be applicable to a particular input device by one of ordinary skill in the art). The foregoing embodiments are not intended to be limiting and those of ordinary skill in the art with the benefit of this disclosure would appreciate the myriad applications and possibilities.

Figure 3:
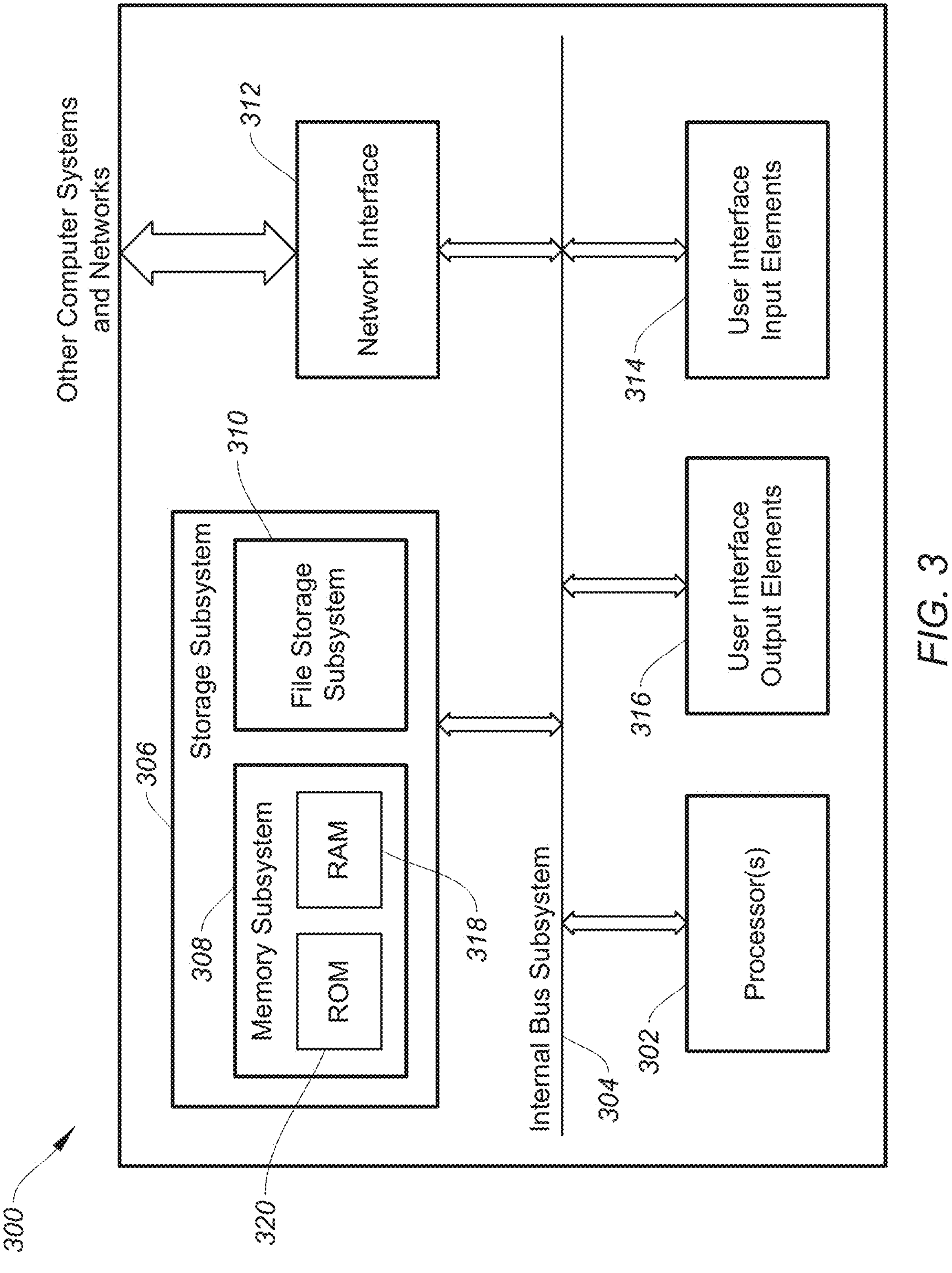
FIG. 3 is a simplified block diagram of a computing device, according to certain embodiments.

FIG. 3 is a simplified block diagram of a computing device 300, according to certain embodiments. Computing device 300 can implement some or all functions, behaviors, and/or capabilities described above that would use electronic storage or processing, as well as other functions, behaviors, or capabilities not expressly described. Computing device 300 includes a processing subsystem (processor(s)) 302, a storage subsystem 306, a user interfaces 314, 316, and a communication interface 312. Computing device 300 can also include other components (not explicitly shown) such as a battery, power controllers, and other components operable to provide various enhanced capabilities. In various embodiments, computing device 300 can be implemented in a host computing device, such as a desktop (e.g., desktop 150) or laptop computer, mobile device (e.g., tablet computer, smart phone, mobile phone), wearable device, media device, or the like, in peripheral devices (e.g., keyboards, etc.) in certain implementations.

Processor(s) 302 can include application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term “memory” refers to a type of long term, short term, volatile, nonvolatile, or other storage medium and is not to be limited to any particular type of memory or number of memories or type of media upon which memory is stored.

Moreover, the term “storage medium” or “storage device” may represent one or more memories for storing data, including read only memory (ROM), RAM, magnetic RAM, core memory, magnetic disk storage mediums, optical storage mediums, flash memory devices and/or other machine-readable mediums for storing information. The term “machine-readable medium” includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a computing device 300 to perform corresponding actions. The instructions may be configured to run in sequential order, in parallel (such as under different processing threads), or in a combination thereof. After loading a code module on a general-purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus, Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Figure 5A:
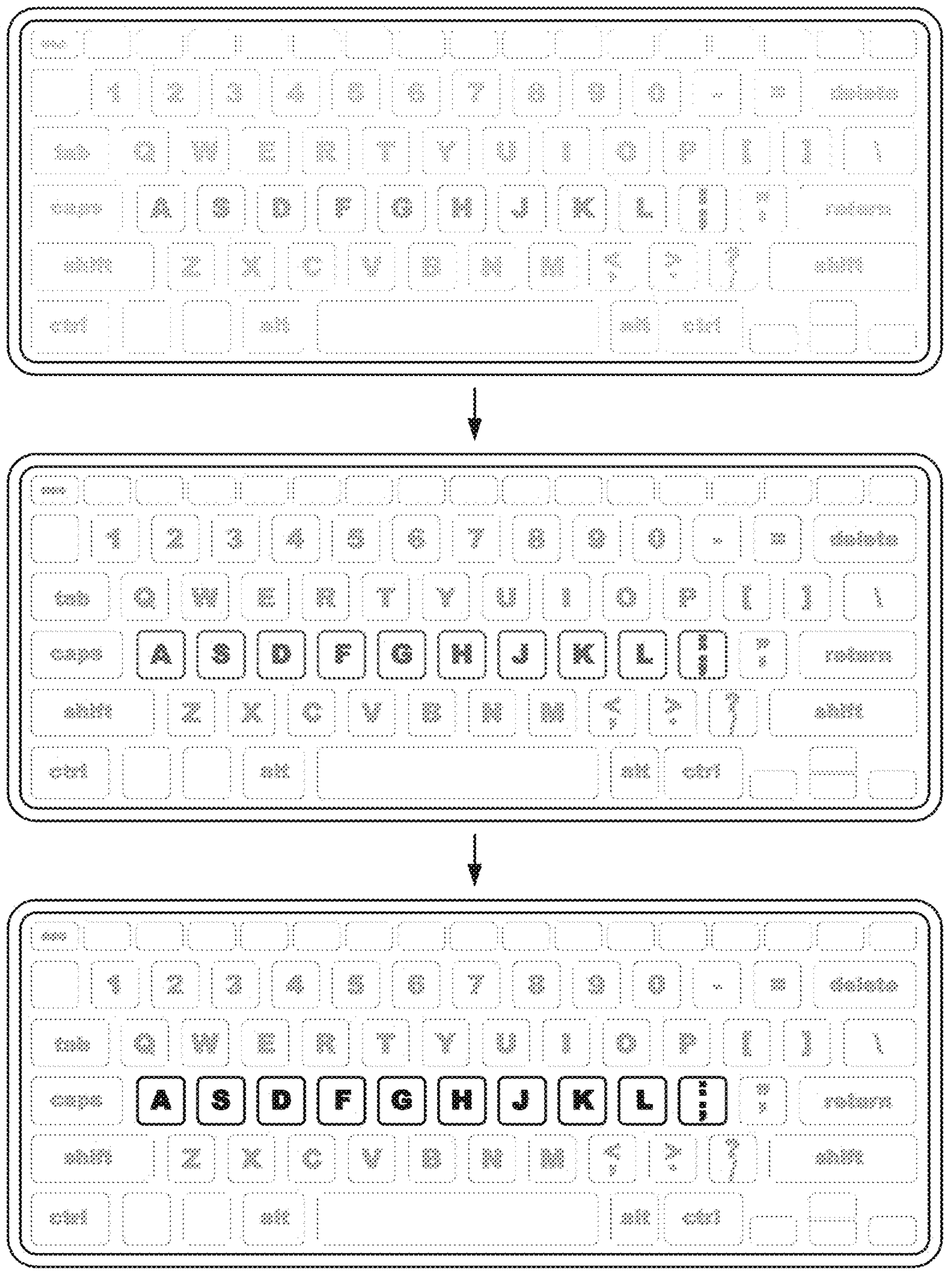
FIG. 5A shows a dynamic lighting sequence where the home row fades in over time, according to certain embodiments.
Figure 5B:
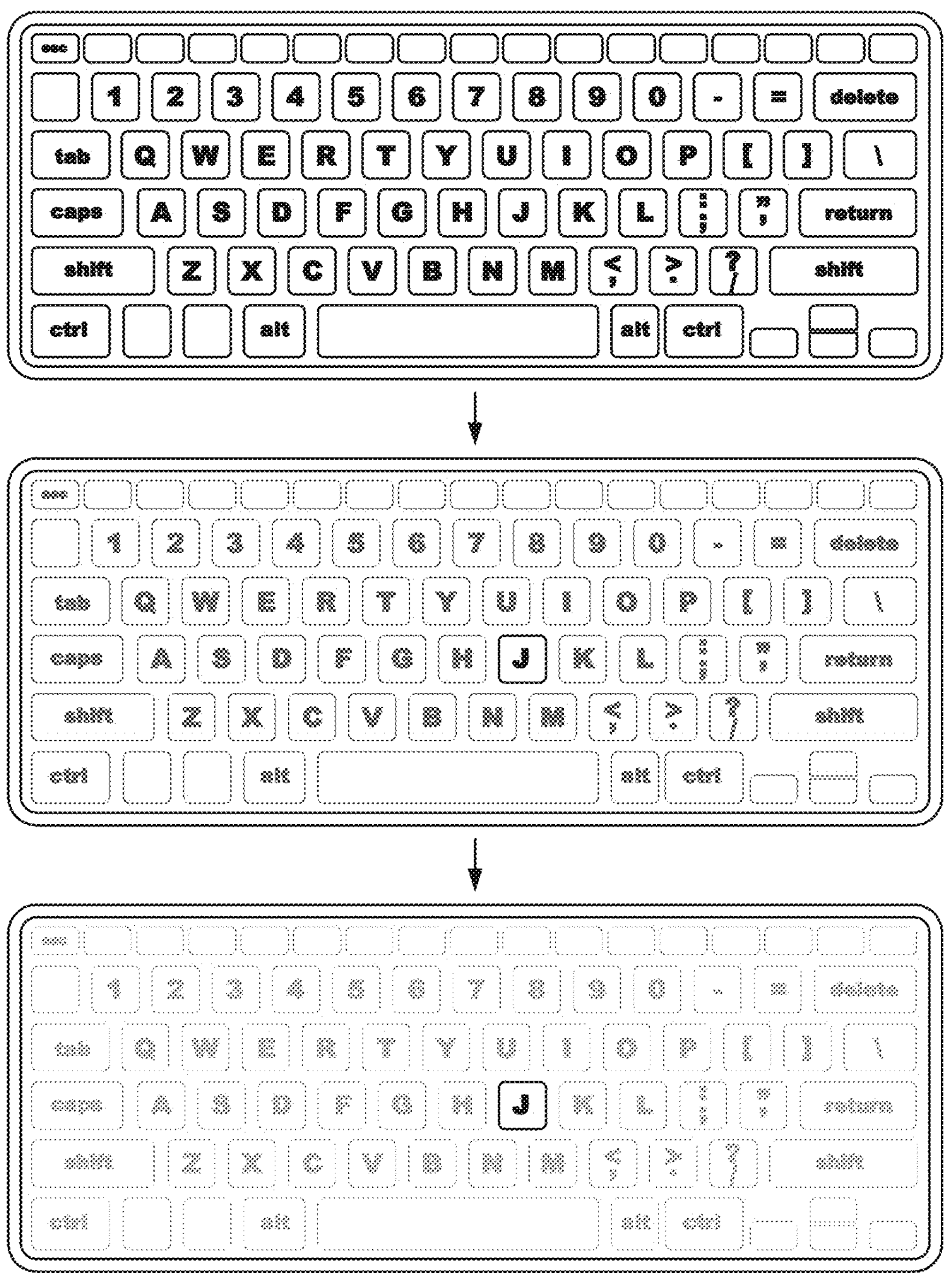
FIG. 5B shows a dynamic lighting sequence where some or all keys are highlighted and slowly fade out over time, leaving one or more target keys highlighted for user identification, according to certain embodiments.
Figure 5C:
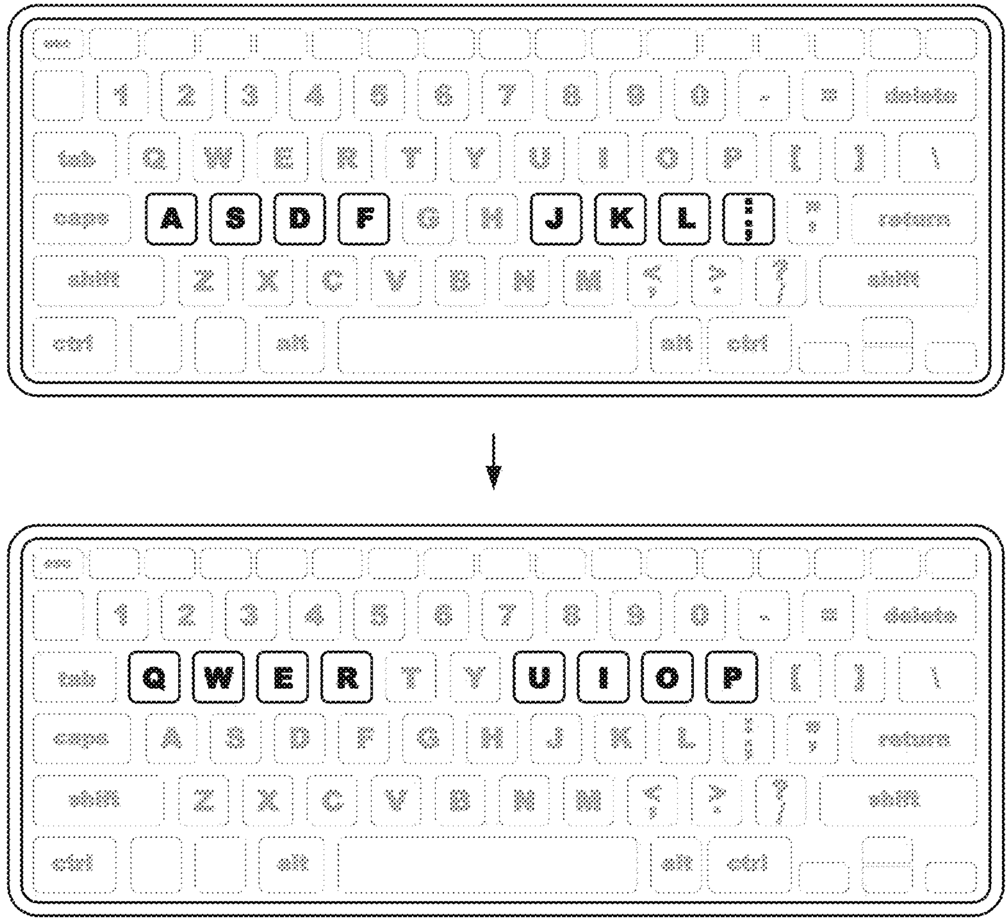
FIG. 5C shows a dynamic lighting sequence that shows a "home row" designation move to a temporary location to accommodate users with limited physical capabilities, according to certain embodiments.
Figure 6A:
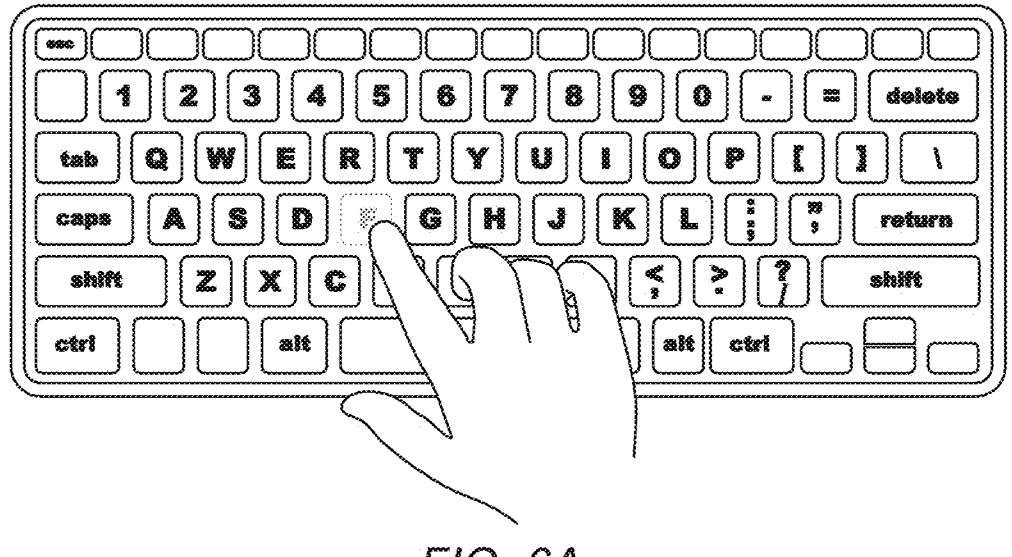
FIG. 6A shows a physical keyboard with an electro-permanent magnet (EPM) or electrostatic brake configured on one or more keys provide a tunable key press feedback profile for corresponding key switches, according to certain embodiments.
Figure 6B:
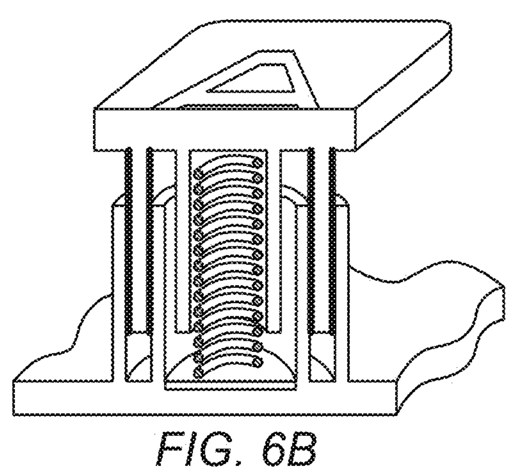
FIG. 6B shows a cross-section of a key structure on a physical keyboard that includes an electrostatic brake, according to certain embodiments.
Figure 6C:
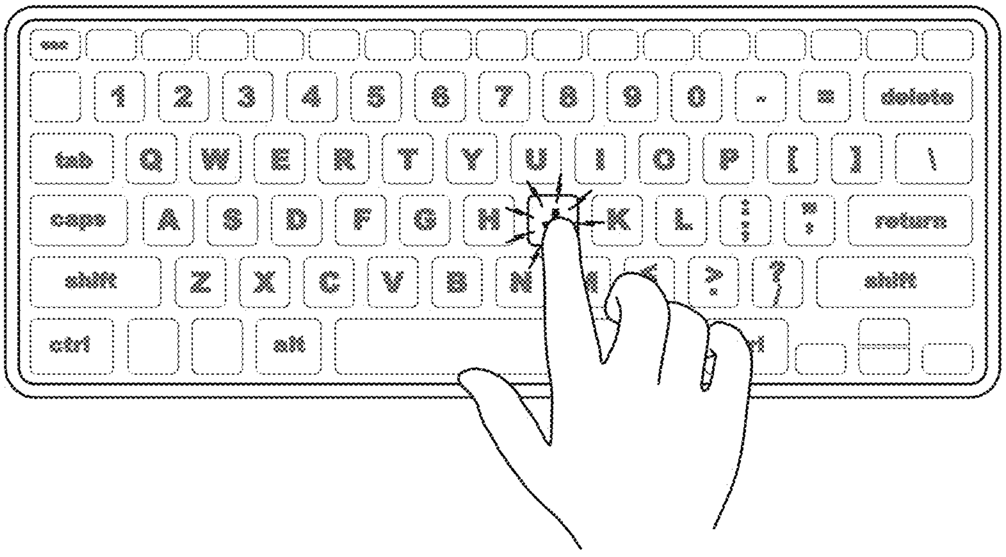
FIG. 6C shows how haptics can be employed to provide mechanical feedback to a user, according to certain embodiments.

Aspects of the invention relate to keyboard systems for teaching and developing typing proficiency and good typing habits for a wide range of age ranges, proficiencies, and physical abilities. For instance, some implementations can analyze performance characteristics (e.g., typing accuracy, speed, motor skills) of a user based on typing data and determine the user's typing proficiency. The system can then control feedback elements on the physical keyboard (e.g., RGB lights, haptics, mechanical key resistance) to help guide the user to type one or more target keys on the keyboard using appropriately adapted feedback element output schemas that match the user's skill level. Both positive and negative feedback can be used, as well as static and dynamic output schemas that can be adapted periodically or in real-time based on the user's current typing proficiency. FIGS. 4A-4D show examples of various static lighting output schemas that provide different levels of visual guidance to the user. FIGS. 5A-5C show examples of some dynamic lighting output schemas, which can be time-based, animated, or the like. FIGS. 6A-6C show some mechanically based implementations of controlled feedback elements, including the use of electromagnets, electrostatic brakes, and haptic feedback.

In some implementations, systems and methods are directed to teaching proper typing habits. For instance, a user may type using improper form, e.g., "hunt and peck" style of typing. Aspects of the invention are configured to reinforce proper typing habits by analyzing how the user's hands are engaging with the physical keyboard and providing a user feedback on one or more feedback elements (e.g., lighting elements, mechanical elements, etc.) of the physical keyboard in response to determining that the user's hand is incorrectly engaging with the keyboard. This may be when the user is pressing a key using an incorrect hand, finger, or is not anchoring or incorrectly anchoring portions of their hand when engaging with the physical keyboard to press the one or more target keys of the plurality of keys, as further described below.

Performance characteristics, which can include a user's typing accuracy, typing speed, motor skills and coordination, can be assessed based on typing data, which can be received in real-time or from one or more previously recorded files that preferably includes timing related information to help the system assess the user's performance characteristics, which can be used to determine a user's typing proficiency. In some cases, a user can provide data (e.g., user age, self-assessed skill level, etc.), or the like. In some aspects, user provided data may come from an assessment performed by the application using the same input device(s). For example, physical motor and cognitive skills may be needed to perform certain abilities like typing, and can be measured and evaluated as much as the typing skill output itself. Thus, some embodiments can be configured to determine improvements in motor skills and cognition. As noted above, the system (e.g., run by processor(s) 210 of system 200) can control feedback elements on the input device (e.g., physical keyboard 140) to help guide the user to type one or more target keys on the keyboard using appropriately adapted feedback element output schemas that match the user's skill level. For example, if the user is supposed to type an 'F' character, but the user does not know where it is on the keyboard, the system can utilize one or feedback elements to indicate where the 'F' character is on the keyboard with varying amounts of particularity depending on the typing proficiency of the user. With lighting elements for the feedback elements (e.g., RGB lights on individual keys of the physical keyboard), the system may cause the lighting elements to highlight an entire side of the keyboard to indicate which hand can access the target key for more experienced typists (e.g., the user may only need a reminder of which hand the target key is located), the lighting elements may highlight a row with the target key for less experienced typists (e.g., the user may need a better hint), or the lighting elements may highlight a different combination of keys (e.g., home row, column, zone, individual key, etc.) to provide visual guidance to the user based on their level of proficiency.

In some aspects, both a display 120 and the physical keyboard can provide differing but complementary output schemas. For example, display 120 may show one or more target keys and indicate that that they are on the left side of the keyboard, while the physical keyboard may activate lighting elements on the left side home row, provide a haptic feedback on the left side home row, change a key press feedback profile for the target keys or keys other than the target keys, or any other suitable output schema, as would be appreciated by one of ordinary skill in the art with the benefit of this disclosure.

Output schemas can be configured to provide positive feedback, negative feedback, or a combination thereof. Some examples of positive feedback can include activating lighting elements that contain one or more target keys (e.g., lighting the left side of the keyboard for target key 'F') or providing a haptic feedback under the target keys or on keys that give a hint of where the target keys are located (e.g., haptic feedback on home row). In both examples, the output schema provides positive guidance on the location of the one or more target keys.

In some embodiments, negative feedback can include output schemas that can operate to redirect our users focus or dissuade a user from pressing certain keys other than the target keys. Some examples of negative feedback can include activating lighting elements that do not contain that one or more target keys. For instance, the right side of the keyboard may flash red when one or more of the target keys are located on the left side. In another example, haptic feedback maybe provided on incorrect key presses. In a further example, a keypress feedback profile may change four keys other than the target keys. For instance, an electrostatic break may be applied to prevent a key from being pressed, which may convey to the user that they are incorrect key.

In certain embodiments, output schemas can be static, dynamic, or combination of both. Static output schemas typically do not change. For example, the system may activate and maintain lighting elements on a row of keys containing a target key(s) for a period of time until the user presses the target key(s). Dynamic output schemas typically change overtime, and in some cases may be dependent upon real time actions of the user. For example, some users may not have sufficient hand strength, hand size, or digital dexterity to anchor their fingers on the home rows while pressing number keys for example. In those cases, an alternative home row position can be suggested (e.g., the "QWER" keys) while the user interfaces with the number keys. A corresponding dynamic output schema may be a dynamic sequence of activated lighting elements that animate a movement of a lighted home row that temporarily moves from the "ASDF" row to the "QWER" row while the user is typing number keys. In another example, the system may highlight a "zone," or a number of keys that should be accessible by a single finger. For example, a static output schema may simultaneously up the 'f, g, b, v, r, t, 4, 5, 6' keys as a zone that is accessible by a user's index finger when resting on the 'f' key on the home row. A dynamic output schema may highlight a path from the 'f' key though the 'r' key and ending at the '4' to show how a user would move their index finger when accessing the '4' key. These are some non-limiting examples and those of ordinary skill in the art with the benefit of this disclosure would appreciate the many modifications, variations, and alternative embodiments thereof. The following figures provide some non-limiting implementations that can be used to adaptively teach a user proper typing technique for a wide variety of users.

Figure 4A:
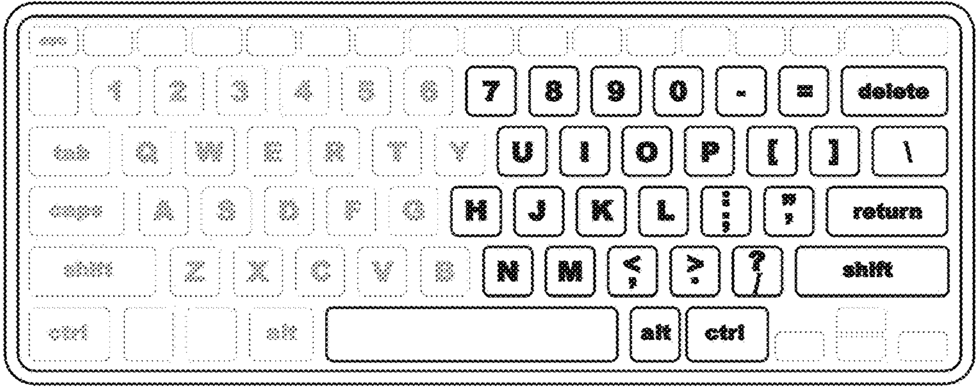
FIG. 4A shows a static output schema that illuminates a plurality of keys configured on the right side of the keyboard, according to certain embodiments.

FIGS. 4A-4D show various static output schemas directed to different lighting modes, according to certain embodiments. In FIG. 4A, a static output schema shows illuminates a plurality of keys configured on the right side of the keyboard, according to certain embodiments. In some embodiments, the right side keys may be illuminated because the system is providing limited positive feedback (e.g., the user may be somewhat proficient—only requiring a reminder about the general location of the key) indicating that a target key (e.g., the 'j' key) is generally located on the right side of the keyboard and accessible by the right hand.

In some instances, FIG. 4A may show the implementation of negative feedback to indicate that the target key (e.g., the 'f' key) is not located on the right side of the keyboard. For instance, the right-side keys may flash red in response to the user pressing one of the keys on the right side. Other effects can be used, such as fade-ins, haptics on the right side, or other suitable implementation to provide positive or negative feedback to communicate a location of one or more target keys.

Figure 4B:
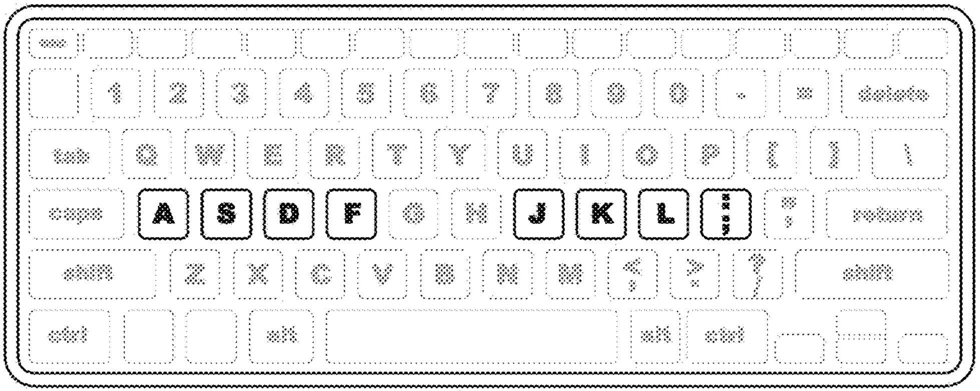
FIG. 4B shows a static output schema of a lighting mode that highlights a plurality of keys on a home row, according to certain embodiments.

FIG. 4B shows a static output schema of a lighting mode that highlights a plurality of keys on a home row, according to certain embodiments. In some aspects, the system may be providing positive feedback to the user indicating that the target key(s) are located on the home row, are accessible from a particular side of the home row (e.g., left side 'asdf' keys), a reminder of where to anchor and/or rest their hands while typing, or the like. In some embodiments, the system may be providing negative feedback by indicating that the target key(s) are not located on the home row. Dynamic aspects can be included, including flashing or fade in/out of the highlighted keys over time (e.g., after a 2 sec of no keyboard inputs by the user).

Figure 4C:
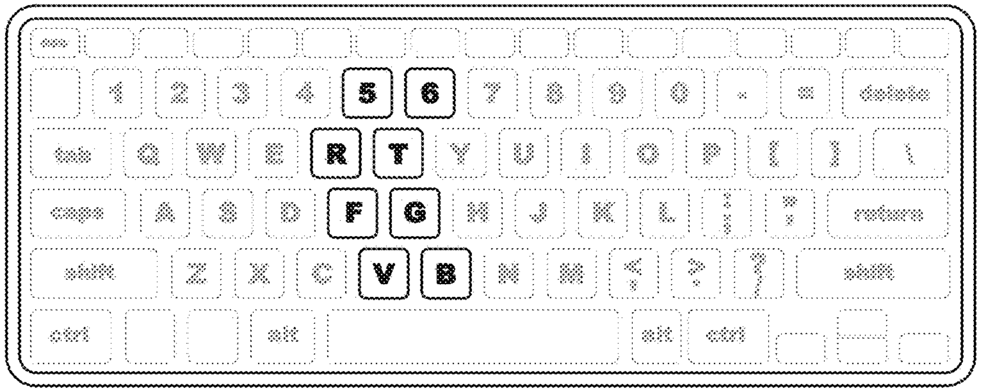
FIG. 4C shows a static output schema of a lighting mode that highlights a plurality of keys in a zone, according to certain embodiments.

FIG. 4C shows a static output schema of a lighting mode that highlights a plurality of keys in a zone, according to certain embodiments. A key zone can include a number of keys adjacent and/or near to a particular key (typically on the home row) that is designated as accessible by a finger resting on the particular key. In some embodiments, the system may highlight a number of keys in a zone to provide positive feedback to a user to let them know which keys a particular finger should be responsible for accessing. For example, a number of keys that may be accessible by the right-hand index finger resting on the 'f' key on the home row may include keys "f, r, 5, 6, t, g, b, and v." In some embodiments, the system may highlight the same number of keys in a zone to provide negative feedback. For example, if a user presses the 'e' key with their left-hand index finger, the system may highlight the "d, e, c" keys to show that 'e' should have been accessed by the left-hand middle finger.

Figure 4D:
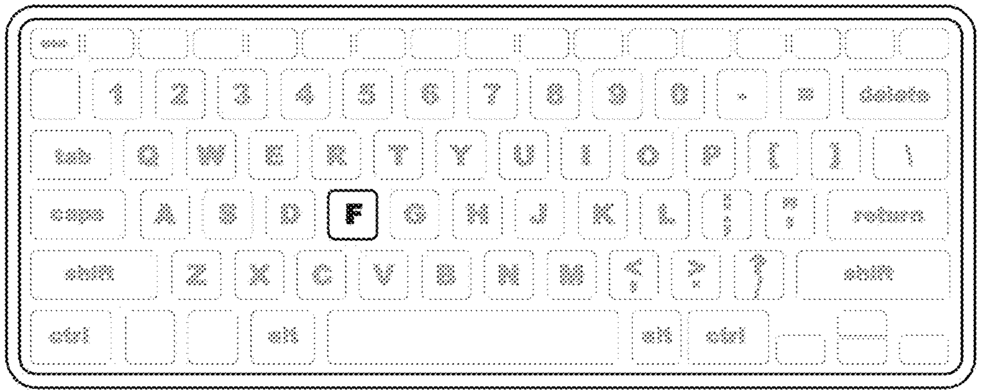
FIG. 4D shows a static output schema of a lighting mode that highlights a particular target key of a plurality of keys on a keyboard, according to certain embodiments.

FIG. 4D shows a static output schema of a lighting mode that highlights a particular target key of a plurality of keys on a keyboard, according to certain embodiments. The system may highlight an individual key to provide positive feedback of the physical location of the target key(s) on the physical keyboard. Alternatively or additionally, haptics can be used to vibrate the key to be pressed, or a key on the home row to indicate to the user which finger should be used to perform the key press, such that there is a direct tactile communication to let the user know which key to use, rather than an on-screen message that requires additional steps of internalizing the message and then physically applying the key press. In some aspects, the system may highlight an individual key to provide negative feedback by indicating that a depressed key is not the correct target key. In certain embodiments, the system may collect user data and adjust zones based on those habits. For example, if a user prefers a certain finger to be used to press a certain key that does not follow a particular recommended typing methodology, but the user has acceptable typing proficiency, the system recognize this deviation as acceptable and may not attempt to change (e.g., correct) the user's typing peculiarities.

FIGS. 5A-5C show various dynamic output schemas directed to different lighting modes, according to certain embodiments. FIG. 5A shows a dynamic lighting sequence where the home row fades in over time, according to certain embodiments. For example, if a user is stuck on one or more target keys, the home row may fade in over time to give the user a hint as to where to place their hands, where the target key is located, or the like. Any suitable time frame can be used to apply a delayed, dynamic fade-in or fade-out effect after no user activity (e.g., 2 s, 5 s, etc.). FIG. 5B shows a dynamic lighting sequence where some or all keys are highlighted and slowly fade out over time, leaving one or more target keys highlighted for user identification, according to certain embodiments. FIG. 5C shows a dynamic lighting sequence that shows a "home row" designation move to a temporary location to accommodate users with limited physical capabilities. For example, some users may not have sufficient hand strength, hand size, or digital dexterity to anchor their fingers on the home rows while pressing number keys for example. In those cases, an alternative home row position can be suggested (e.g., the "QWER" keys) while the user interfaces with the number keys. A corresponding dynamic output schema may be a dynamic sequence of activated lighting elements that dynamically animate a movement of a lighted home row that temporarily moves from the "ASDF" row to the "QWER" row while the user is typing number keys. In some aspects, the movement may be highlight the temporary home row statically. In some embodiments, if a user that is leveraging the dynamic hints at a high performing rate and accuracy (e.g., the user is highly accurate with zone lighting), the system may gradually reduce the level of the hints or remove them all together. Thus, the system can provide an appropriate challenge and learning curve for the user to gradually move away from, for example, a "hunt-and-peck" style of typing, to the hint system described herein (e.g., providing lighted keys, zones, etc., positive/negative feedback, etc.). Some other dynamic modes may include color-coded changing of zones like a cold-to-warm hint as in a children's game, hint fading (e.g., LEDs gradually fade at different rates based on proficiency), or the like.

FIGS. 6A-6C show various mechanically-based implementations of controlled feedback elements, including the use of electromagnets, electrostatic brakes, and haptic feedback, to provide various output schemas that can be configured to provide positive feedback, negative feedback, or a combination thereof. The implementation of electromagnets, magneto-rheostatic fluid, and electrostatic brakes are discussed in detail in U.S. patent application Ser. No. 17/553,549, filed Dec. 16, 2021, and titled "Electro-Permanent-Magnet-Based Force Profile For An Input Element On An Input Device," U.S. Pat. No. 11,048,344, issued on Jun. 29, 2021, and titled "Combining Electro-permanent Magnets and Magnetorheological Fluid To Control An Operation Of An Input Device," and U.S. Pat. No. 11,227,732, filed Apr. 30, 2020, and titled "Electrostatic Brake For Peripheral Device Buttons," where the disclosures of which are herein incorporated by reference in their entirety for all purposes.

FIG. 6A shows a physical keyboard with an electro-permanent magnet (EPM) or electrostatic brake configured on one or more keys provide a tunable key press feedback profile for corresponding key switches, according to certain embodiments. In FIG. 6A, negative feedback is provided to the user on a key (e.g., the 'f' key) by way of a feedback profile that blocks are resists the key press to indicate that the key that the user is attempting to depress is an incorrect key. In some embodiments, both negative and positive feedback output schemas can be used. For instance, the target keys may have a key press feedback profile that is easy to press, non-target keys may have a key press feedback profile that is difficult to press, or a combination thereof. In some cases, a less obvious negative feedback can be employed where keys in a zone or home row containing the target keys may be easy to press, while keys outside of said zone or row may have a strong resistance to being depressed. FIG. 6B shows a cross-section of a key structure on a physical keyboard that includes an electrostatic brake, according to certain embodiments. FIG. 6C shows how haptics can be employed to provide mechanical feedback to a user, according to certain embodiments. For example, haptics may provide negative feedback to the user by providing a haptic vibration to an incorrect key being pressed or engaged by the user. In some implementations, haptics may provide positive feedback by providing a haptic vibration on the correct target key, on a home row, or the like. In certain dynamic applications, haptic sensations can be provide under the fingers of a user and can move to successive keys towards a target key to provide a user with a vibrational map of the correct location of a target key without the user having to look down on the physical keyboard for visual confirmation. In such cases, they type of vibration (e.g., strength, vibrational properties, duration, etc.) may have different meanings, such as indications of a correct or incorrect key, a path to a target key, or the like. Haptic vibration can include single or multiple "bumps," vibrations, or other forms of haptic output, as would be appreciated by one of ordinary skill in the art with the benefit of this disclosure. In some embodiments, the system may adjust a feedback (e.g., EPM, electrostatic brake, haptic) based on the user's performance, physical, and cognitive data. For example, if the system detects a weaker finger force through data analytics of outside keys that typically require the use of a user's pinky finger, the resistance of those keys can be reduced accordingly for that user. This could also apply to a real-time user emotional response. For example, if the system detects a higher-than-normal heart rate or typing speed, harder key presses or key presses above a recommended ergonomic value, the feedback system could reduce the amount of force required to press the key or prompt the user in any suitable manner to help the user prevent stress injuries.

Figure 7:
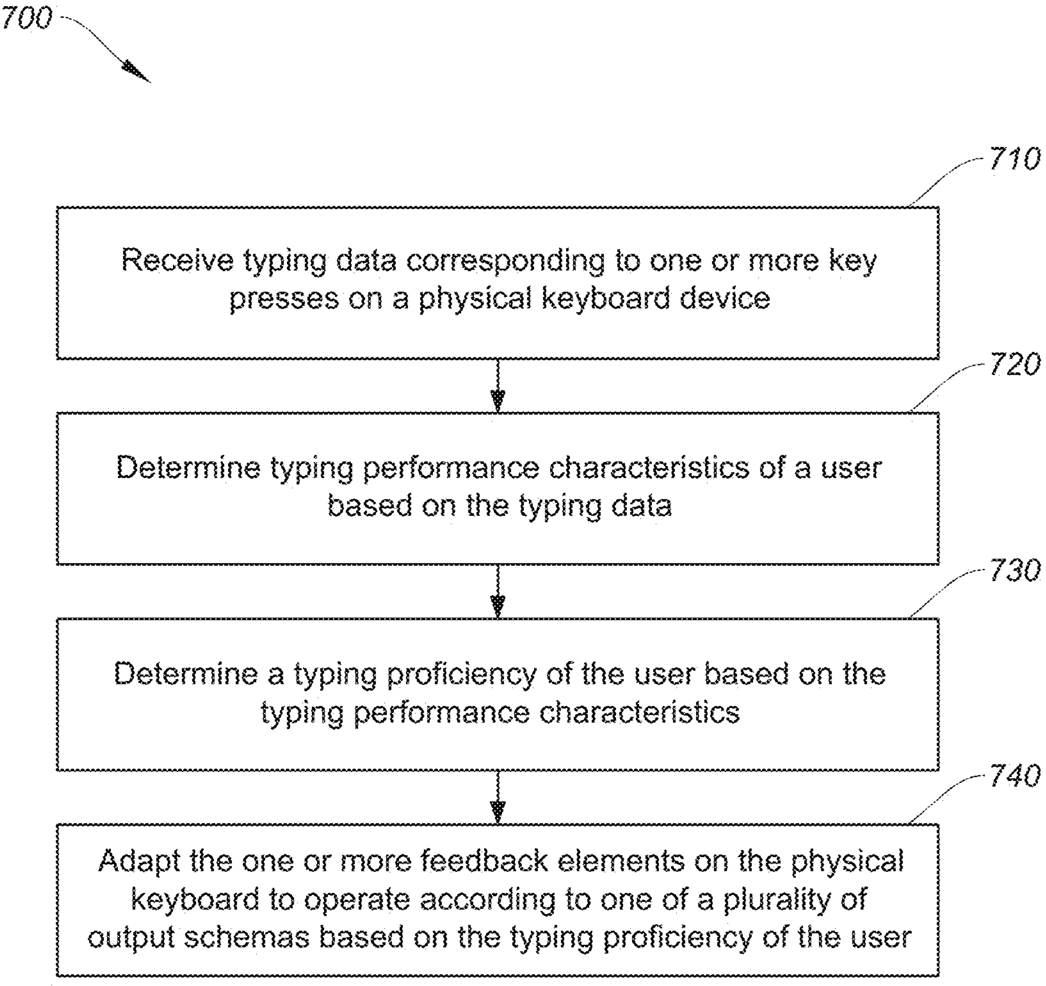
FIG. 7 is a simplified flow chart showing aspects of a method 700 for adaptively adjusting a system configured for keyboard interface assistance, according to certain embodiments.

FIG. 7 is a simplified flow chart showing aspects of a method 700 for adaptively adjusting a system configured for keyboard interface assistance, according to certain embodiments. Method 700 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 700 can be performed by aspects of system 200, 300, or a combination thereof.

At operation 710, method 700 can include receiving typing data corresponding to one or more key presses on a physical keyboard device having a plurality of keys, the physical keyboard device including one or more feedback elements, according to certain embodiments. Typing data can be real-time data, stored data, or a combination thereof corresponding to key presses on the physical keyboard device (e.g., alphanumeric inputs, symbols, etc.).

At operation 720, method 700 can include determining typing performance characteristics of a user based on the typing data, according to certain embodiments. Typing performance characteristics can include typing accuracy, typing speed, user hand motor skills. Other performance characteristics can be considered (e.g., typing pauses, adherence to proper typing form (e.g., keeping unused fingers on the home row), accuracy over different alphanumeric characters (e.g., accurate with 'f' but inaccurate with 'x'), finger strength and/or dexterity, and more, as would be appreciated by one of ordinary skill in the art with the benefit of this disclosure. In some embodiments, optical switches or other suitable elements can be used to determine key press travel distance, speed-force characteristics of a key press, etc., and can thus be used to glean performance characteristics. One of ordinary skill in the art with the benefit of this disclosure would appreciate the many modifications, variations, and alternative embodiments thereof.

At operation 730, method 700 can include determining a typing proficiency of the user based on the typing performance characteristics, according to certain embodiments. In some implementations, performance characteristics can be weighted differently with respect to each other. For example, typing accuracy and typing speed may be weigh more heavily than typing pauses for determining a user's typing proficiency.

At operation 740, method 700 can include adapting the one or more feedback elements on the physical keyboard to operate according to one of a plurality of output schemas based on the typing proficiency of the user, according to certain embodiments. The feedback elements can include lighting elements corresponding to the plurality of keys on the physical keyboard. The plurality of output schemas can include a plurality of lighting modes configured to provide visual guidance identifying a location of one or more target keys of the plurality of keys. Each of the plurality of lighting modes may typically provide a different amount of visual guidance based on the typing proficiency of the user. For example, the lighting modes may include a first lighting mode causing the plurality of lighting elements to highlight a side of the keyboard that the one or more target keys are located, a second lighting mode causing the plurality of lighting elements to highlight a column or row of keys that the one or more target keys are located, a third lighting mode causing the plurality of lighting elements to highlight a zone (e.g., keys adjacent or near a target key or keys) of the keyboard that the one or more target keys are located, and a fourth lighting mode causing the plurality of lighting elements to individually highlight the one or more target keys.

In some embodiments, the lighting modes can be time-based lighting modes and may include a first animated lighting mode that reveals the one or more target keys over a threshold time by gradually increasing an illumination of the one or more target keys using a first lighting pattern based on a time threshold. Some embodiments may include a second animated lighting mode that reveals the one or more target keys over a threshold time by gradually decreasing an illumination of the plurality of keys not including the one or more target keys using a second lighting pattern based on a time threshold.

In further embodiments, each of the one or more feedback elements includes a key switch operationally controlled by an EPM assembly or an electrostatic brake, wherein the EPM-assembly and the electrostatic brake are operable to provide a tunable key press feedback profile for their corresponding key switch including a first key press feedback profile for one or more target keys and a second key press feedback profile for the plurality of keys not including the one or more target keys, wherein the second key press feedback profile has a greater resistance to key switch actuation than the first key press feedback profile.

In certain embodiments, the physical keyboard device and a display device are communicatively coupled and controlled by a host computing device, and method 700 can further include causing visual feedback corresponding to the one or more target keys to be rendered on the display device, where the plurality of output schemas on the physical keyboard device is different than the visual feedback on the display device. In some aspects, the one or more feedback elements operate according to a first set of the plurality of output schemas when a user is determined to have satisfactory hand motor skills, and the one or more feedback elements operate according to a second, different set of the plurality of output schemas when a user is determined to have unsatisfactory hand motor skills. For instance, a child may have a very small hand size and may not be able to keep their unused fingers on the home row as they press other keys, particularly when trying to access the number keys. In such cases, the system may accommodate the user by highlighting the 'qwer' and 'uiop' keys as temporary home keys while the user accesses the number keys, and then subsequently highlighting the standard home row keys to cue the user to return their fingers to the home row.

Embodiments of the system can be configured to teach particularly young children some of the mechanics of typing even before they may know how to spell. For example, some output schemas can be configured to light adjacent keys and have the user keep one finger on a first key while depressing the second key, regardless of the alphanumeric character or function of the key. Any combination of key press exercises can be formulated using any of the feedback elements described herein (e.g., lighting elements, haptic elements, EPM or electrostatic brake-controlled key structures, etc.) to teach any functional aspect of teaching. In some embodiments, motor skills can be trained by using output schemas that have users press various combinations or sequences of keys to improve a user's dexterity or finger strength, for example. For instance, a typical key may require 50 gf to be fully depressed. Some users, like young children or users with compromised motor skills, may have difficulty with providing 50 gf for all keys, particularly when anchoring the rest of the fingers on the home row. In such cases, once the typing performance characteristics of the user is determined (e.g., low finger strength), some implementations may change a key press feedback profile (e.g., 30 gf) for some or all keys on the keyboard to accommodate the capabilities of the user. In some aspects, this may be applied to only a set of keys that the user has difficulty pressing. For instance, users may have an easier time pressing the 'g' key with their index finger than the 'z' key with their pinky and anchored hand. One of ordinary skill in the art with the benefit of this disclosure would appreciate the many modifications, variations, and alternative embodiments thereof.

It should be understood that the system may determine the user's typing proficiency at any suitable interval including real-time, continuous assessment and adaptation, periodic assessments (e.g., hourly, daily, weekly, etc.) or other suitable interval, to dynamically adapt to the user's skill level.

It should be appreciated that the specific steps illustrated in FIG. 7 provide a particular method 700 for adaptively adjusting a system configured for keyboard interface assistance, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Figure 8:
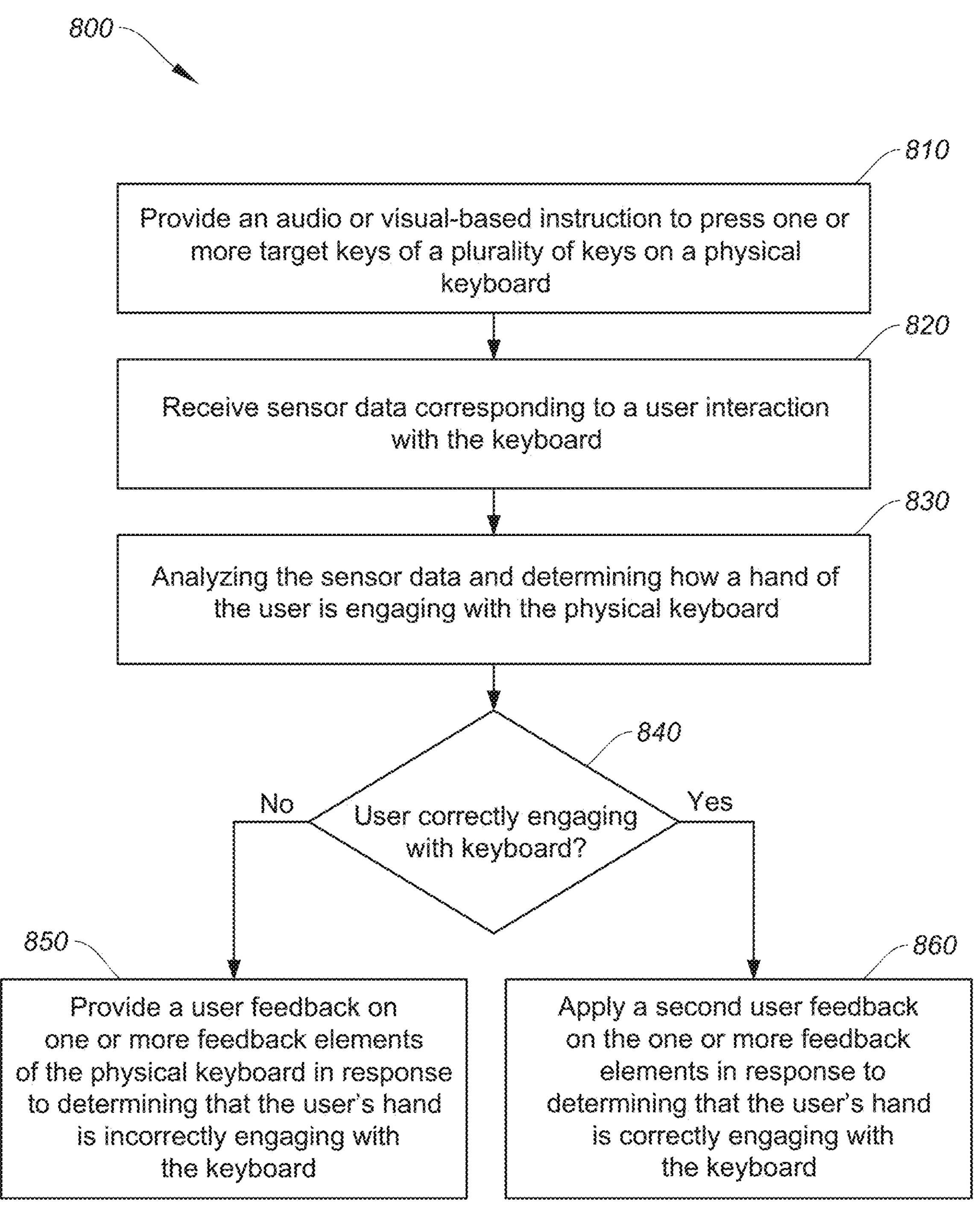
FIG. 8 is a simplified flow chart showing aspects of a method 800 for operating a keyboard habit teaching system that teaches typing techniques and ergonomics, according to certain embodiments.

FIG. 8 is a simplified flow chart showing aspects of a method 800 for operating a keyboard habit teaching system that teaches typing techniques and ergonomics, according to certain embodiments. Method 800 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 800 can be performed by aspects of system 200, 300, or a combination thereof.

At operation 810, method 800 can include providing an audio or visual-based instruction to press one or more target keys of a plurality of keys on a physical keyboard, according to certain embodiments. The audio or visual-based instructions may be provided on a display, speakers, or other suitable electronic device.

At operation 820, method 800 can include receiving sensor data corresponding to a user interaction with the keyboard, according to certain embodiments.

At operation 830, method 800 can include analyzing the sensor data and determining how a hand of the user is engaging with the physical keyboard, according to certain embodiments.

At operation 840, method 800 can include providing a user feedback on one or more feedback elements of the physical keyboard in response to determining that the user's hand is incorrectly engaging with the keyboard (operation 850), according to certain embodiments. In some embodiments, method 800 can include applying a second user feedback on the one or more feedback elements that is different than the first user feedback on the physical keyboard in response to determining that the user's hand is correctly engaging with the keyboard (operation 860).

In some embodiments, the system may determine that the user's hand is incorrectly engaged with the physical keyboard when the user is pressing a key using an incorrect hand, the user is pressing the key with an incorrect finger, or the user is not anchoring or incorrectly anchoring portions of their hand when engaging with the physical keyboard to press the one or more target keys of the plurality of keys.

In certain embodiments, the one or more feedback elements can include a plurality of lighting elements, and the user feedback includes executing a lighting schema with the plurality of lighting elements that guides the user to correctly engage with the keyboard.

Figure 9:
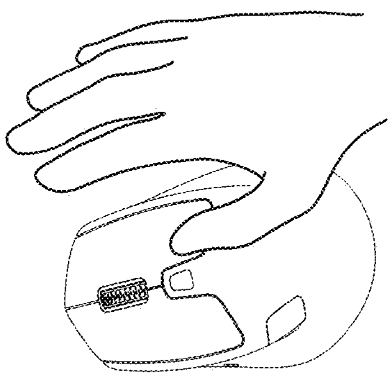
FIG. 9 shows a keyboard system configured to highlight the home row on a keyboard using lighting elements when the user releases a computer mouse, according to certain embodiments.
Figure 9:
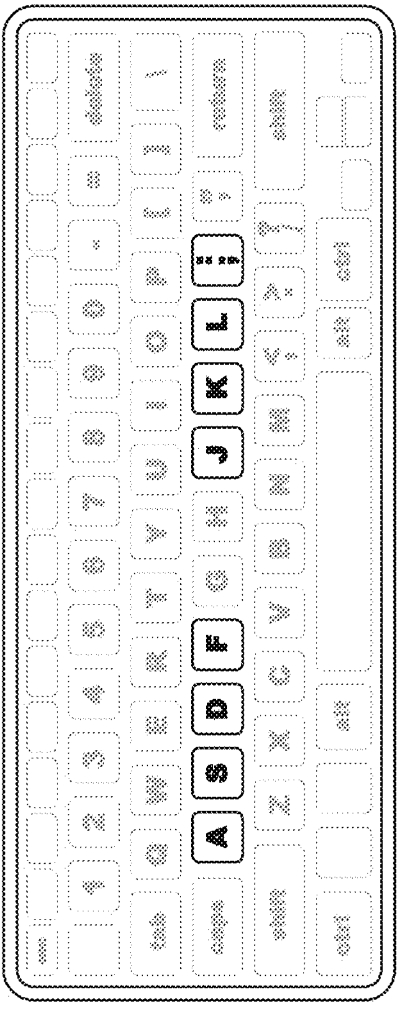

Alternatively or additionally, method 800 may include detecting when a computer mouse is being controlled by the user, where the computer mouse and physical keyboard are communicatively coupled to a common host computing device, determining when the user lets go of the computer mouse, and executing a second lighting schema that highlights a home row on the plurality of keys of the keyboard, as shown for example in FIG. 9.

In some embodiments, the one or more feedback elements are key switches of the plurality of keys that are operationally controlled by an electro-permanent magnet (EPM) assembly, an electrostatic brake, or the like, and the EPM-assembly and the electrostatic brake can be operable to provide a tunable key press feedback profile for their corresponding key switch including a first key press feedback profile for one or more target keys and a second key press feedback profile for the plurality of keys not including the one or more target keys, wherein the second key press feedback profile has a greater resistance to key switch actuation than the first key press feedback profile.

In certain embodiments, the sensor data can be received from an image sensor device (e.g., web cam, video camera, or other image sensor device), and analyzing the sensor data may include identifying an orientation and location of the user's hand based on the sensor data, and comparing the orientation and location of the user's hand to a reference. Determining that the user's hand is incorrectly engaged with the keyboard may include detecting when the orientation and location of the user's hand is not within a threshold orientation (e.g., engaged with the home row) and location as compared to the reference, or that an incorrect finger is being used to depress a target key. In some aspects, analyzing the sensor data can include determining a direction of a user's gaze based on the sensor data and comparing the direction of the user's gaze to a location of the target keys of the plurality of keys. In such cases, determining that the user's hand is incorrectly engaged with the keyboard includes detecting when the user's gaze is not within a threshold distance of the location of the target keys of the plurality of keys. In further embodiments, the sensor data may indicate that the user is using a wrong hand to implement a key press. For example, a user may use their left hand to press the 'h' key. In such cases, the system may alert the user that the wrong hand/finger is being used to effectuate the key press in a number of ways, which can include visual indication (e.g., a message on the display, flashing red lights on the physical keyboard, not showing the keypress on the screen), tactile or mechanical indication (e.g., using EPM or electrostatic brake to prevent the key from being pressed, providing haptic feedback on the key being engaged), audio indication (e.g., voice or tone indicating incorrect typing form), or the like. In such cases, the system may be aware that a target key is being incorrectly engaged, despite that the correct key is being depressed, which can further enhance training regiments. The system can further cache a key press entry for certain keys (e.g., non-home row keys) until the user returns their fingers to the home row, to help train the user to maintain proper typing habits. As described above, the system adaptively learns and applies different levels of feedback and assistance based on the user's proficiency.

In some implementations, the sensor data can be received from one or more touch sensitive sensors, analyzing the sensor data includes determining a location of the user's hand based on the sensor data, and determining that the user's hand is incorrectly engaged with the keyboard can include detecting when the location of the user's hand is not on the target keys of the plurality of keys.

In some embodiments, ergonomics can be trained using the systems described herein. For example, using the various sensors described herein, user wrist movements, overused fingers, body configuration, etc., can be tracked and reported back to the user in real-time, at intervals (e.g., daily, weekly, etc.), to bring user awareness to their typing behaviors and habits, and provide feedback to prevent short term or long term overuse and ergonomic-based injuries.

It should be appreciated that the specific steps illustrated in FIG. 8 provide a particular method 800 for operating a keyboard habit teaching system, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

In some embodiments, other peripheral devices can be used to provide user feedback to teach typing habits. For instance, FIG. 9 shows a keyboard system configured to highlight the home row on a keyboard using lighting elements when the user releases a computer mouse, according to certain embodiments. Presumably, when a user lets go of the computer mouse, they are likely to engage the keyboard again. Providing an output schema to highlight the home row on the physical keyboard can help the user reposition their hands in the proper location to begin typing. In some embodiments, other criteria can be used to initiate the output schema including a threshold time period (e.g., 5 s) where the user is not moving the computer mouse. One of ordinary skill in the art with the benefit of this disclosure would appreciate the many modifications, variations, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising:

providing an audio or visual-based instruction to press one or more target keys of a plurality of keys on a physical keyboard;

providing sensor data from the physical keyboard corresponding to a user interaction with the keyboard;

analyzing the sensor data and determining how a hand of the user is engaging with the physical keyboard;

determining the typing proficiency of the user based on both a speed of typing based on a speed of reception of the sensor data and a determination of how the user's hand is engaging with the keyboard from the sensor data; and activating one of a plurality of lighting elements on the physical keyboard to indicate a position of the one or more target keys, wherein the plurality of lighting elements operate in a plurality of lighting modes including at least indicating a general area of the keyboard and indicating individual keys, and wherein the selection of which lighting elements to activate is based on a measured typing proficiency of the user.

2. The method of claim 1 wherein the plurality of lighting modes includes at least two or more of:

a first lighting mode causing the plurality of lighting elements to highlight a side of the keyboard where the one or more target keys are located;

a second lighting mode causing the plurality of lighting elements to highlight a column or row of keys where the one or more target keys are located;

a third lighting mode causing the plurality of lighting elements to highlight a zone of the keyboard where the one or more target keys are located, wherein the keyboard includes a home row of keys, and wherein the zone corresponds to a plurality of keys adjacent to a particular key of the home row of keys; and a fourth lighting mode causing the plurality of lighting elements to individually highlight the one or more target keys.

3. The method of claim 1 further comprising determining that the user's hand is incorrectly engaged with the physical keyboard when at least one of the following occurs:

the user is pressing the target key using an incorrect hand;

the user is pressing the target key with an incorrect finger; or the user is not anchoring or incorrectly anchoring portions of their hand when engaging with the physical keyboard to press the one or more target keys of the plurality of keys.

4. The method of claim 1 wherein the lighting modes are time-based lighting modes and include at least one of:

a first animated lighting mode that reveals the one or more target keys over a threshold time by gradually increasing an illumination of the one or more target keys using a first lighting pattern based on the threshold time;

a second animated lighting mode that reveals the one or more target keys over a threshold time by gradually decreasing an illumination of the plurality of keys not including the one or more target keys using a second lighting pattern based on the threshold time.

5. The method of claim 1 further comprising:

detecting when a computer mouse is being controlled by the user, wherein the computer mouse and the physical keyboard are communicatively coupled to a common host computing device;

determining when the user lets go of the computer mouse; and executing a lighting schema that highlights a home row on the plurality of keys of the keyboard.

6. The method of claim 1 further comprising providing sensor data from an image sensor device identifying an orientation and location of the user's hand based on the sensor data;

comparing the orientation and location of the user's hand to a reference;

determining that the user's hand is incorrectly engaged with the keyboard by detecting when the orientation and location of the user's hand is not within a threshold orientation and location as compared to the reference.

7. The method of claim 1 further comprising receiving sensor data from an image sensor device determining a direction of the user's gaze based on the sensor data;

comparing the direction of the user's gaze to a location of the target keys of the plurality of keys, determining that the user's hand is incorrectly engaged with the keyboard by detecting when the user's gaze is not within a threshold distance of the location of the target keys of the plurality of keys.

8. The method of claim 1 further comprising receiving sensor data from one or more touch sensitive sensors, analyzing the sensor data to determine a location of the user's hand based on the sensor data, and determining that the user's hand is incorrectly engaged with the keyboard by detecting when the location of the user's hand is not on the target keys of the plurality of keys.

9. A system comprising:

a physical keyboard having a plurality of lighting elements to indicate a position of keys on the physical keyboard;

one or more processors;

one or more machine-readable, non-transitory storage mediums that include instructions configured to cause the one or more processors to perform operations including:

providing an audio or visual-based instruction to press one or more target keys of a plurality of keys on the physical keyboard;

receiving sensor data corresponding to a user interaction with the keyboard;

analyzing the sensor data and determining how a hand of the user is engaging with the physical keyboard; and determining the typing proficiency of the user based on both a speed of typing based on a speed of reception of the sensor data and a determination of how the user's hand is engaging with the keyboard from the sensor data; and activating one of the plurality of lighting elements on the physical keyboard to indicate a position of the one or more target keys, wherein the plurality of lighting elements operate in a plurality of lighting modes including at least indicating a general area of the keyboard and indicating individual keys, and wherein the selection of which lighting elements to activate is based on a measured typing proficiency of the user.

10. The system of claim 9 wherein the lighting modes include at least two or more of:

a first lighting mode causing the plurality of lighting elements to highlight a side of the keyboard where the one or more target keys are located;

a second lighting mode causing the plurality of lighting elements to highlight a column or row of keys where the one or more target keys are located;

a third lighting mode causing the plurality of lighting elements to highlight a zone of the keyboard where the one or more target keys are located, wherein the keyboard includes a home row of keys, and wherein the zone corresponds to a plurality of keys adjacent to a particular key of the home row of keys; and a fourth lighting mode causing the plurality of lighting elements to individually highlight the one or more target keys.

11. The system of claim 9 further comprising determining that the user's hand is incorrectly engaged with the physical keyboard when at least one of the following occurs:

the user is pressing the target key using an incorrect hand;

the user is pressing the target key with an incorrect finger; or the user is not anchoring or incorrectly anchoring portions of their hand when engaging with the physical keyboard to press the one or more target keys of the plurality of keys.

12. The system of claim 9 wherein the lighting modes are time-based lighting modes and include at least one of:

a first animated lighting mode that reveals the one or more target keys over a threshold time by gradually increasing an illumination of the one or more target keys using a first lighting pattern based on the threshold time;

a second animated lighting mode that reveals the one or more target keys over a threshold time by gradually decreasing an illumination of the plurality of keys not including the one or more target keys using a second lighting pattern based on the threshold time.

13. The system of claim 9 wherein the instructions are further configured to cause the one or more processors to perform operations including:

detecting when a computer mouse is being controlled by the user, wherein the computer mouse and the physical keyboard are communicatively coupled to a common host computing device;

determining when the user lets go of the computer mouse; and executing a lighting schema that highlights a home row on the plurality of keys of the keyboard.

14. A computer-readable storage medium having data stored therein representing computer readable, non-transitory software executable by one or more processors, the software including instructions operable to cause the one or more processors to perform operations including:

providing an audio or visual-based instruction to press one or more target keys of a plurality of keys on a physical keyboard;

receiving sensor data corresponding to a user interaction with the keyboard;

analyzing the sensor data and determining how a hand of the user is engaging with the physical keyboard; and determining the typing proficiency of the user based on both a speed of typing based on a speed of reception of the sensor data and a determination of how the user's hand is engaging with the keyboard from the sensor data; and activating one of a plurality of lighting elements on the physical keyboard to indicate a position of the one or more target keys, wherein the plurality of lighting elements operate in a plurality of lighting modes including at least indicating a general area of the keyboard and indicating individual keys, and wherein the selection of which lighting elements to activate is based on a measured typing proficiency of the user.

15. The computer-readable storage medium of claim 14 wherein the lighting modes include at least two or more of:

a first lighting mode causing the plurality of lighting elements to highlight a side of the keyboard where the one or more target keys are located;

a second lighting mode causing the plurality of lighting elements to highlight a column or row of keys where the one or more target keys are located;

a third lighting mode causing the plurality of lighting elements to highlight a zone of the keyboard where the one or more target keys are located, wherein the keyboard includes a home row of keys, and wherein the zone corresponds to a plurality of keys adjacent to a particular key of the home row of keys; and a fourth lighting mode causing the plurality of lighting elements to individually highlight the one or more target keys.

16. The computer-readable storage medium of claim 14 further comprising determining that the user's hand is incorrectly engaged with the physical keyboard when at least one of the following occurs:

the user is pressing the target key using an incorrect hand;

the user is pressing the target key with an incorrect finger; or the user is not anchoring or incorrectly anchoring portions of their hand when engaging with the physical keyboard to press the one or more target keys of the plurality of keys.

17. The computer-readable storage medium of claim 14 wherein the lighting modes are time-based lighting modes and include at least one of:

a first animated lighting mode that reveals the one or more target keys over a threshold time by gradually increasing an illumination of the one or more target keys using a first lighting pattern based on the threshold time;

a second animated lighting mode that reveals the one or more target keys over a threshold time by gradually decreasing an illumination of the plurality of keys not including the one or more target keys using a second lighting pattern based on the threshold time.

18. The computer-readable storage medium of claim 17 wherein the instructions are further operable to cause the one or more processors to perform operations including:

detecting when a computer mouse is being controlled by the user, wherein the computer mouse and the physical keyboard are communicatively coupled to a common host computing device;

determining when the user lets go of the computer mouse; and executing a lighting schema that highlights a home row on the plurality of keys of the keyboard.

19. The computer-readable storage medium of claim 14 further comprising providing sensor data from an image sensor device identifying an orientation and location of the user's hand based on the sensor data;

comparing the orientation and location of the user's hand to a reference;

determining that the user's hand is incorrectly engaged with the keyboard by detecting when the orientation and location of the user's hand is not within a threshold orientation and location as compared to the reference.

* * * * *